United States Patent
Buyse et al.

(10) Patent No.: US 10,696,396 B2
(45) Date of Patent: Jun. 30, 2020

(54) STABILITY SYSTEMS FOR TETHERED UNMANNED AERIAL VEHICLES

(71) Applicant: RSQ-Systems SPRL, Genval (BE)

(72) Inventors: Mathieu Buyse, Genval (BE); Jean Marc Coulon, Sant Julia de Loria (AD); Mike Blavier, Vilvoorde (BE)

(73) Assignee: RSQ-SYSTEMS US LLC, College Station, TX (US)

(*) Notice: Subject to any disclaimer, the term of this patent is extended or adjusted under 35 U.S.C. 154(b) by 282 days.

(21) Appl. No.: 15/912,130

(22) Filed: Mar. 5, 2018

(65) Prior Publication Data

US 2019/0270518 A1    Sep. 5, 2019

(51) Int. Cl.
    *B64C 39/02*   (2006.01)

(52) U.S. Cl.
    CPC .......... *B64C 39/022* (2013.01); *B64C 39/024* (2013.01); *B64C 2201/027* (2013.01); *B64C 2201/123* (2013.01); *B64C 2201/14* (2013.01)

(58) Field of Classification Search
    CPC ............... B64C 39/022; B64C 39/024; B64C 2201/027; B64C 2201/123; B64C 2201/14
    USPC ...................................................... 244/17.03
    See application file for complete search history.

(56) References Cited

U.S. PATENT DOCUMENTS

| | | | |
|---|---|---|---|
| 2,948,489 A * | 8/1960 | Miller, Jr. ............. | B64C 39/022 244/17.17 |
| 2,980,365 A * | 4/1961 | Yohe ..................... | B64C 39/022 244/23 R |
| 3,148,847 A * | 9/1964 | Manificat .............. | B64C 39/022 244/17.17 |
| 3,149,803 A * | 9/1964 | Petrides ................ | B64C 39/022 244/17.13 |
| 3,223,359 A | 12/1965 | Quick et al. | |

(Continued)

FOREIGN PATENT DOCUMENTS

| CA | 3009980 A1 * | 7/2017 | ........... B64C 39/022 |
|---|---|---|---|
| CA | 3009980 A1 | 7/2017 | |

(Continued)

OTHER PUBLICATIONS

International Search Report and Written Opinion for Application No. PCT/US2019/013681 dated May 1, 2019 (12 pages).

(Continued)

*Primary Examiner* — Christopher P Ellis
(74) *Attorney, Agent, or Firm* — Michael Best & Friedrich LLP

(57) ABSTRACT

An unmanned aerial vehicle including a body, a platform, a rotor, a tether cable, and an actuation system. The platform is coupled to the body such that the platform is rotatable relative to the body about a first horizontal axis of rotation. The rotor is rigidly coupled to the platform such that the rotor and the platform rotate together about the first horizontal axis of rotation. The tether cable extends away from the body and is coupled to the body such that the tether cable is rotatable relative to the body about a second horizontal axis of rotation. The first and second horizontal axes of rotation are normal to a vertical plane. The actuation system is configured to rotate the platform in a clockwise direction about the first horizontal axis of rotation when the tether cable rotates in a counter-clockwise direction about the second horizontal axis of rotation.

20 Claims, 14 Drawing Sheets

(56) References Cited

U.S. PATENT DOCUMENTS

| | | | |
|---|---|---|---|
| 8,350,403 B2* | 1/2013 | Carroll | B65H 75/4402 |
| | | | 290/55 |
| 8,948,928 B2 | 2/2015 | Alber et al. | |
| 9,056,676 B1 | 6/2015 | Wang | |
| 9,056,687 B2* | 6/2015 | Shachor | B64F 1/12 |
| 9,139,310 B1 | 9/2015 | Wang | |
| 9,457,900 B1* | 10/2016 | Jones | B64C 39/024 |
| 9,663,214 B2* | 5/2017 | Guetta | B64B 1/50 |
| 9,671,787 B2 | 6/2017 | Foinet et al. | |
| 9,696,725 B2 | 7/2017 | Wang | |
| 9,789,947 B2* | 10/2017 | Glass | B64B 1/52 |
| 9,826,256 B2 | 11/2017 | Sham | |
| 9,952,022 B2* | 4/2018 | Ueno | F41H 7/04 |
| 9,975,632 B2* | 5/2018 | Alegria | G01C 21/005 |
| 10,246,188 B2* | 4/2019 | Ichihara | B64C 39/024 |
| 10,364,026 B1* | 7/2019 | Hanlon | B64F 3/02 |
| 10,370,102 B2 | 8/2019 | Boykin et al. | |
| 10,507,914 B2* | 12/2019 | Walker | B64F 3/00 |
| 2009/0005164 A1 | 1/2009 | Chang | |
| 2009/0294584 A1 | 12/2009 | Lovell et al. | |
| 2009/0314883 A1 | 12/2009 | Arlton et al. | |
| 2010/0308174 A1 | 12/2010 | Calverley | |
| 2011/0180667 A1 | 7/2011 | O'Brien et al. | |
| 2011/0315810 A1 | 12/2011 | Patrov | |
| 2012/0181380 A1 | 7/2012 | Van Staagen et al. | |
| 2013/0233964 A1 | 9/2013 | Woodworth et al. | |
| 2014/0183300 A1* | 7/2014 | MacCulloch | B64C 39/024 |
| | | | 244/1 TD |
| 2015/0142250 A1 | 5/2015 | Cavender-Bares et al. | |
| 2015/0153741 A1* | 6/2015 | North | G05D 1/08 |
| | | | 290/44 |
| 2015/0298806 A1 | 10/2015 | Vander Lind et al. | |
| 2016/0200437 A1* | 7/2016 | Ryan | B64C 39/022 |
| | | | 244/99.2 |
| 2016/0318607 A1* | 11/2016 | Desai | B64D 1/16 |
| 2017/0029105 A1* | 2/2017 | Ferren | B64C 39/022 |
| 2017/0043872 A1 | 2/2017 | Whitaker et al. | |
| 2017/0126031 A1 | 5/2017 | Mo | |
| 2017/0161972 A1 | 6/2017 | Moloney et al. | |
| 2017/0193308 A1 | 7/2017 | Buyse et al. | |
| 2017/0235018 A1 | 8/2017 | Foster et al. | |
| 2017/0259941 A1* | 9/2017 | Briggs, IV | B64F 3/02 |
| 2017/0275025 A1 | 9/2017 | Johnson et al. | |
| 2018/0009549 A1 | 1/2018 | Sullivan et al. | |
| 2018/0050797 A1 | 2/2018 | Palmer et al. | |
| 2018/0050800 A1 | 2/2018 | Boykin et al. | |
| 2018/0118374 A1 | 5/2018 | Lombardini et al. | |
| 2018/0212413 A1 | 7/2018 | Hundemer | |
| 2018/0251216 A1* | 9/2018 | Whitaker | B64F 3/00 |
| 2018/0312276 A1* | 11/2018 | Miller | B64F 1/125 |
| 2019/0088156 A1 | 3/2019 | Choi et al. | |
| 2019/0106208 A1 | 4/2019 | Sun et al. | |
| 2019/0144114 A1 | 5/2019 | Chen et al. | |
| 2019/0161183 A1* | 5/2019 | Hagianu | B64C 39/024 |
| 2019/0220038 A1 | 7/2019 | Shih et al. | |
| 2019/0295033 A1 | 9/2019 | Longin et al. | |

FOREIGN PATENT DOCUMENTS

| | | | |
|---|---|---|---|
| CA | 3018601 A1 | 9/2017 | |
| DE | 102005014949 A1 | 10/2006 | |
| EP | 3287358 A1 | 2/2018 | |
| FR | 3037448 A1 * | 12/2016 | B64C 39/022 |
| JP | 2017-218061 A | 12/2017 | |
| WO | 2007/141795 A1 | 12/2007 | |
| WO | 2016/200021 A1 | 12/2016 | |
| WO | 2017/029611 A1 | 2/2017 | |
| WO | 2017/147188 A1 | 8/2017 | |
| WO | WO-2018100564 A1 * | 6/2018 | B64C 39/022 |

OTHER PUBLICATIONS

International Search Report and Written Opinion for Application No. PCT/IB2019/000877 dated Dec. 13, 2019 (14 pages).

International Search Report and Written Opinion for Application No. PCT/IB2019/000889 dated Dec. 5, 2019 (13 pages).

International Search Report and Written Opinion for Application No. PCT/US2019/020573 dated Jun. 19, 2019 (15 pages).

* cited by examiner

STABILITY SYSTEMS FOR TETHERED UNMANNED AERIAL VEHICLES

BACKGROUND

Unmanned aerial vehicles (UAVs) including remotely piloted and autonomous drones are used in a wide variety of applications such as surveillance, filming, and exploration. In some situations, an unmanned aerial vehicle is tethered to an object via a cable to collect data in the area around the object. For example, an unmanned aerial vehicle may be tethered to a car to collect pictures, audio, and video of the area around the car when a collision occurs. As an unmanned aerial vehicle flies through the air, gusts of wind or other disturbances may cause unintended movement which impedes the unmanned aerial vehicle's ability to collect data. For example, unintended movement may cause an on-board camera to become off-centered and images or recordings of the camera to become blurry or unclear. Thus, there is a need for a system of maintaining alignment between an unmanned aerial vehicle and an attached cable while the unmanned aerial vehicle is in flight.

SUMMARY

The disclosure provides an unmanned aerial vehicle. In one embodiment, the unmanned aerial vehicle includes a body, a platform, a rotor, a tether cable, and an actuation system. The platform is coupled to the body such that the platform is rotatable relative to the body about a first horizontal axis of rotation. The rotor is rigidly coupled to the platform such that the rotor and the platform rotate together about the first horizontal axis of rotation. The tether cable extends away from the body and is coupled to the body such that the tether cable is rotatable relative to the body about a second horizontal axis of rotation. The first horizontal axis of rotation and the second horizontal axis of rotations are normal to a vertical plane that extends through the body. The actuation system is configured to rotate the platform in a clockwise direction about the first horizontal axis of rotation when the tether cable rotates in a counter-clockwise direction about the second horizontal axis of rotation.

The disclosure also provides an unmanned aerial vehicle. In one embodiment, the unmanned aerial vehicle includes a body, a platform, a rotor, a tether cable, and a pulley system. The platform is coupled to the body such that the platform is rotatable relative to the body about a first horizontal axis of rotation. The rotor is rigidly coupled to the platform such that the rotor and the platform rotate together about the first horizontal axis of rotation. The tether cable extends away from the body and is coupled to the body such that the tether cable is rotatable relative to the body about a second horizontal axis of rotation. The first horizontal axis of rotation and the second horizontal axis of rotations are normal to a vertical plane that extends through the body. The pulley system is configured to rotate the platform in a clockwise direction about the first horizontal axis of rotation when the tether cable rotates in a counter-clockwise direction about the second horizontal axis of rotation.

The disclosure further provides an unmanned aerial vehicle. In one embodiment, the unmanned aerial vehicle includes a body, a platform, an electronic actuator, a rotor, a tether cable, and an electronic controller. The platform is coupled to the body. The electronic actuator is configured to rotate the platform relative to the body about a first horizontal axis of rotation. The rotor is rigidly coupled to the platform such that the rotor and the platform rotate together about the first horizontal axis of rotation. The tether cable extends away from the body and is coupled to the body such that the tether cable is rotatable relative to the body about a second horizontal axis of rotation. The first horizontal axis of rotation and the second horizontal axis of rotations are normal to a vertical plane that extends through the body. The electronic controller is configured to determine movement of the tether cable relative to the body. The electronic controller is also configured to drive the electronic actuator to rotate the platform in a clockwise direction about the first horizontal axis of rotation when the tether cable rotates in a counter-clockwise direction about the second horizontal axis of rotation.

Other aspects and embodiments will become apparent by consideration of the detailed description and accompanying drawings.

Figure 1:
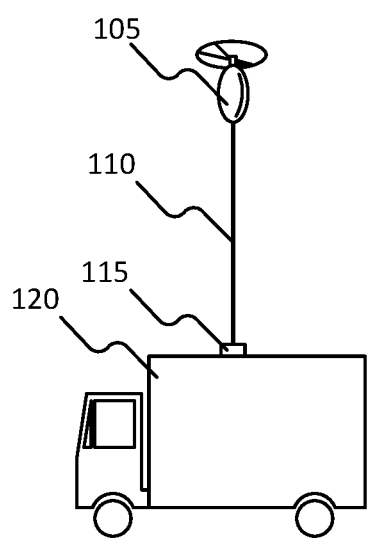
FIG. 1 is an unmanned aerial vehicle tethered to a truck via a tether cable, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding various embodiments so as not to obscure the disclosure with details that will be readily apparent to those of ordinary skill in the art having the benefit of the description herein.

DETAILED DESCRIPTION

Before any embodiments are explained in detail, it is to be understood that no embodiment is necessarily limited in its application to the details of construction and the arrangement of components set forth in the following description or illustrated in the following drawings. Other embodiments are possible and embodiments described are capable of being practiced or of being carried out in various ways.

It should also be noted that a plurality of different structural components may be utilized to implement the disclosure. Furthermore, and as described in subsequent paragraphs, the specific configurations illustrated in the drawings are intended to exemplify certain embodiments. Alternative configurations are possible.

FIG. 1 is a diagram of one example embodiment of an unmanned aerial vehicle (UAV) 105. The unmanned aerial vehicle 105 includes a tether cable 110 that couples the unmanned aerial vehicle 105 to an object. In the embodiment illustrated in FIG. 1, the tether cable 110 couples the unmanned aerial vehicle 105 to a coupling 115 that is affixed to a truck 120. In other embodiments, the tether cable 110 may tether the unmanned aerial vehicle 105 to a fixed structure (for example, a building). In other embodiments, the tether cable 110 may tether the unmanned aerial vehicle 105 to a user via a wearable device such as a pin. Alternatively, a user may hold the tether cable 110.

FIGS. 2 through 5 are diagrams of one example embodiment of an unmanned aerial vehicle 200. In FIGS. 2 through 5, the unmanned aerial vehicle 200 includes the tether cable 110, a body 205, a platform 210, a shaft 215, a plurality of rotors 220, and a pulley system 225. The body 205 includes a first end 230 and a second end 235. The second end 235 of the body 205 is opposite from the first end 230 of the body 205.

In FIGS. 2 through 5, the platform 210 is positioned proximate to the first end 230 of the body 205 and is at least partially exposed. The platform 210 is coupled to the body 205 such that the platform 210 is rotatable relative to the body 205 about a first horizontal axis of rotation 240 (illustrated in FIGS. 3 and 5). The tether cable 110 is coupled to the body 205 such that the tether cable 110 is rotatable relative to the body 205 about a second horizontal axis of rotation 242 (illustrated in FIGS. 3 and 5). The first horizontal axis of rotation 240 and the second horizontal axis of rotation 242 are both normal to a first vertical plane 244 extending through the body 205. The platform 210 is also rotatable relative to the body 205 about a third horizontal axis of rotation 246 (illustrated in FIGS. 2 and 4). The tether cable 110 is also rotatable relative to the body 205 about a fourth horizontal axis of rotation 248 (illustrated in FIGS. 2 and 4). The third horizontal axis of rotation 246 and the fourth horizontal axis of rotation 248 are both normal to a second vertical plane 250 extending through the body 205. The second vertical plane 250 is orthogonal to the first vertical plane 244. The first horizontal axis of rotation 240 is orthogonal to the third horizontal axis of rotation 246. The second horizontal axis of rotation 242 is orthogonal to the fourth horizontal axis of rotation 248.

The plurality of rotors 220 are rigidly coupled to the platform 210 (via the shaft 215) such that the plurality of rotors 220, the shaft 215, and the platform 210 rotate together about the first horizontal axis of rotation 240 and the third horizontal axis of rotation 246.

Figure 2:
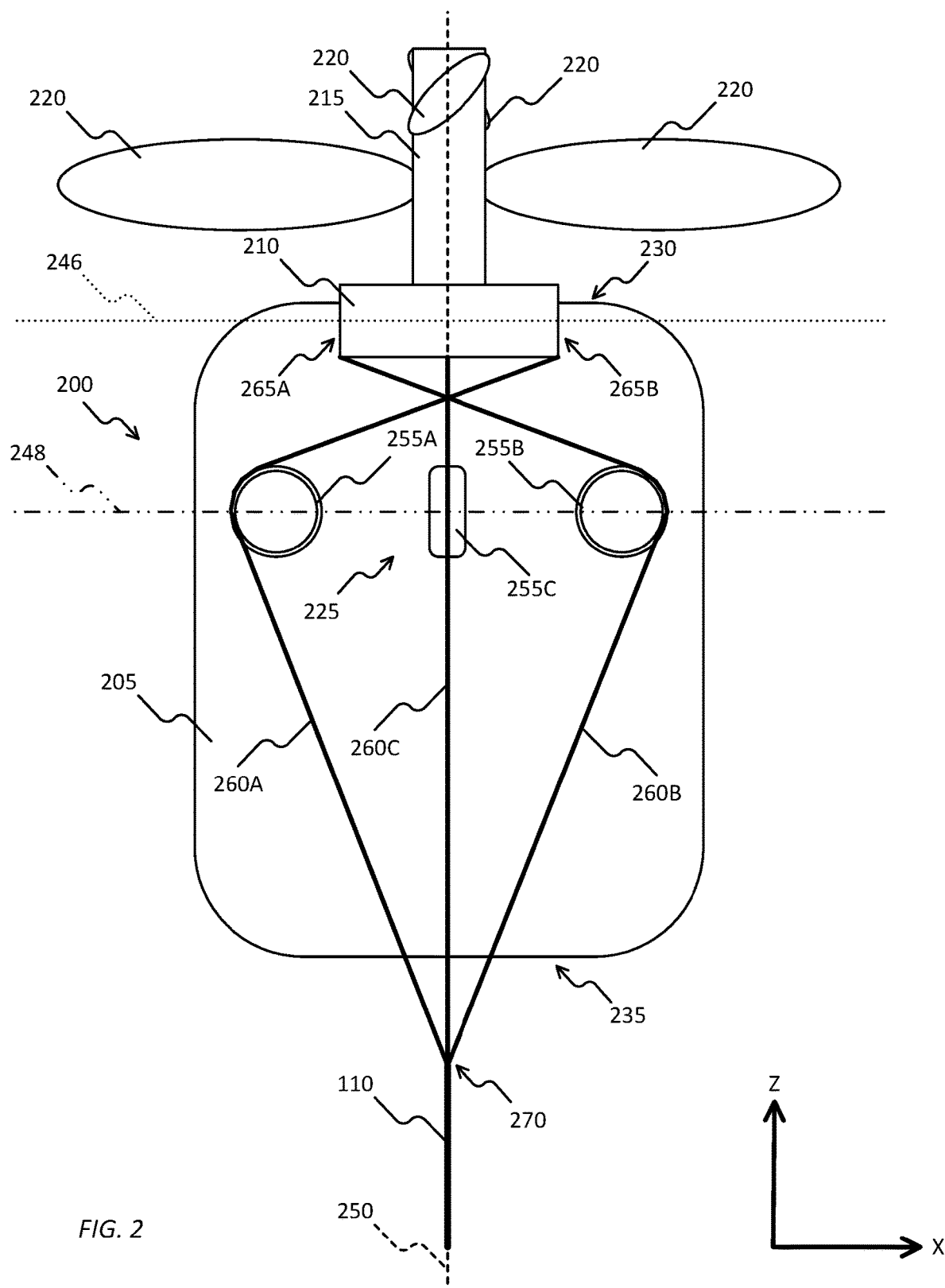
FIG. 2 is a partial sectional view of an unmanned aerial vehicle including a pulley system and a tether cable at rest along a reference axis, in accordance with some embodiments.

In FIGS. 2 through 5, the pulley system 225 is disposed primarily within the body 205 and includes, among other things, a first pulley 255A, a second pulley 255B, a third pulley 255C, a fourth pulley 255D, a first cable 260A, a second cable 260B, a third cable 260C, and a fourth cable 260D. As illustrated in FIG. 2, the first cable 260A is supported by the first pulley 255A. The first cable 260A wraps around the first pulley 255A and couples to the platform 210. The second cable 260B is supported by the second pulley 255B. The second cable 260B wraps around the second pulley 255B and couples to the platform 210. The first cable 260A and the second cable 260B are arranged in an "X" shape. In other words, the first pulley 255A is positioned proximate a first side 265A of the platform 210 and the second pulley 255B is positioned proximate a second side 265B of the platform 210. The second side 265B of the platform 210 is opposite from the first side 265A of the platform 210. The first cable 260A wraps around the first pulley 255A and couples to an edge of the second side 265B of the platform 210. The second cable 260B wraps around the second pulley 255B and couples to an edge of the first side 265A of the platform 210.

Figure 3:
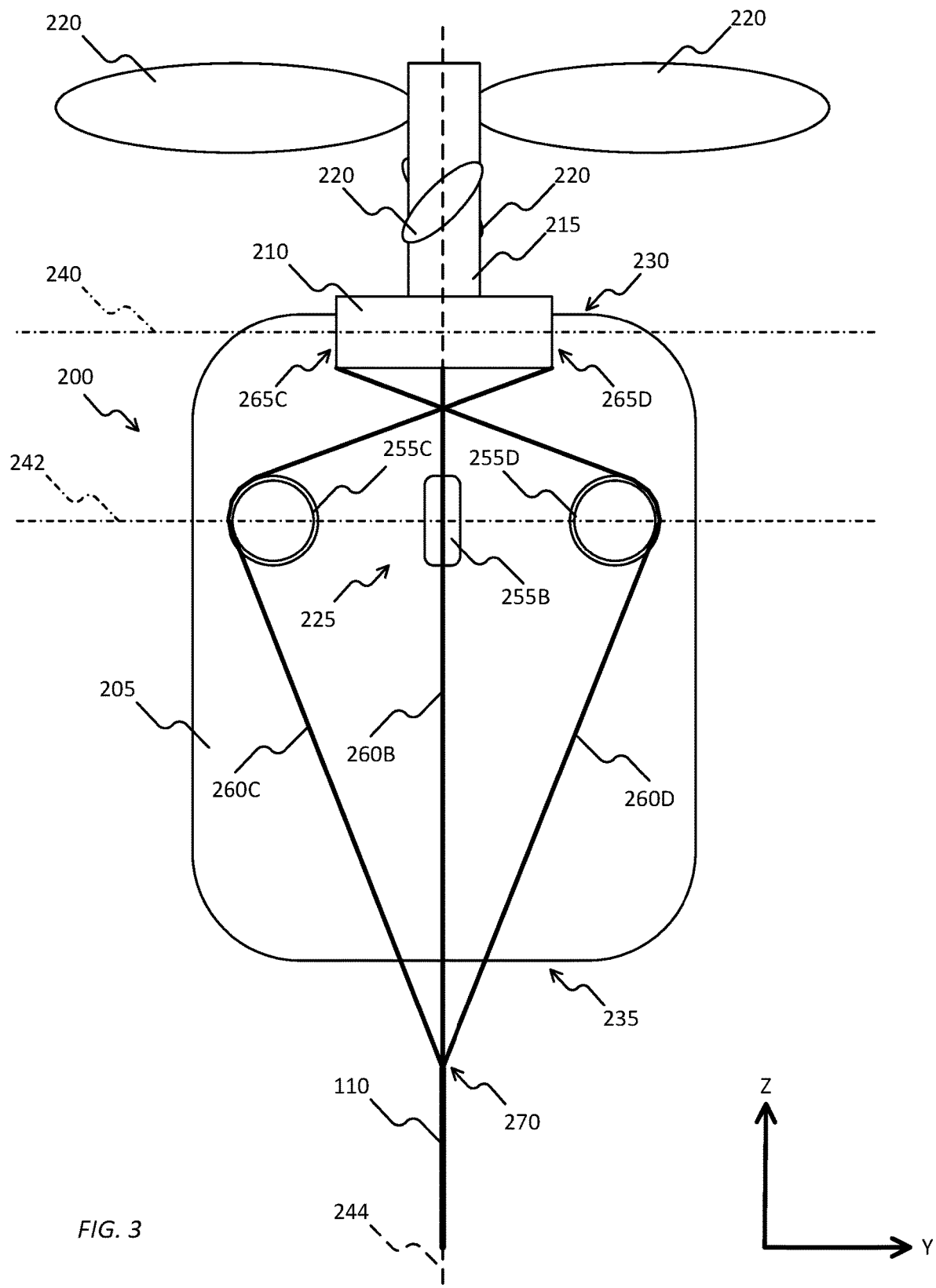
FIG. 3 is a partial sectional view of the unmanned aerial vehicle of FIG. 2 rotated 90 degrees about the Z-axis, in accordance with some embodiments.

As illustrated in FIG. 3, the third cable 260C is supported by the third pulley 255C. The third cable 260C wraps around the third pulley 255C and couples to the platform 210. The fourth cable 260D is supported by the fourth pulley 255D. The fourth cable 260D wraps around the fourth pulley 255D and couples to the platform 210. The third cable 260C and the fourth cable 260D are arranged in an "X" shape. In other words, the third pulley 255C is positioned proximate a third side 265C of the platform 210 and the fourth pulley 255D is positioned proximate a fourth side 265D of the platform 210. The fourth side 265D of the platform 210 is opposite from the third side 265C of the platform 210. The third cable 260C wraps around the third pulley 255C and couples to an edge of the fourth side 265D of the platform 210. The fourth cable 260D wraps around the fourth pulley 255D and couples to an edge of the third side 265C of the platform 210.

The tether cable 110, the first cable 260A, the second cable 260B, the third cable 260C, and the fourth cable 260D are joined together at a connection point 270. In the embodiment illustrated in FIGS. 2 through 5, the connection point 270 is positioned external to the body 205 and proximate to the second end 235. Alternatively, the connection point 270 may be positioned internal to the body 205. The tether cable 110 extends away from the body 205 (and the connection point 270) in a direction generally opposite from the lift direction of the rotors 220. At rest, the tether cable 110 extends away from the body 205 along the intersection of the first vertical plane 244 and the second vertical plane 250, as illustrated in FIGS. 2 and 3. Hereinafter, the intersection of the first vertical plane 244 and the second vertical plane 250 is referred to as the reference axis (not shown). As the unmanned aerial vehicle 200 flies through the air, gusts of wind or other disturbances (for example, movement of the object to which the tether cable 110 is attached to) cause the tether cable 110 to rotate out of alignment with the reference axis.

Figure 4:
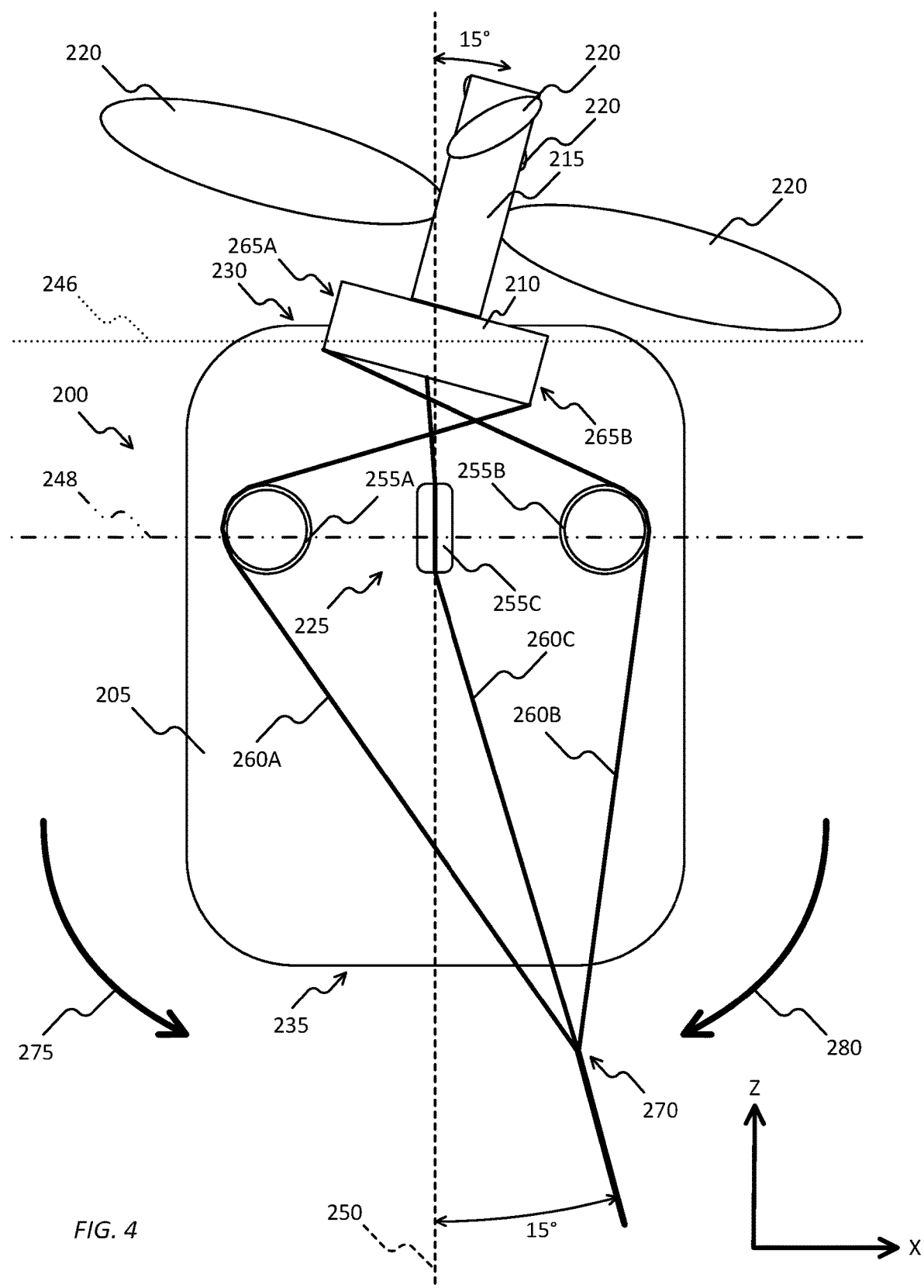
FIG. 4 is a partial sectional view of the unmanned aerial vehicle of FIG. 2 after the tether cable rotates away from the reference axis, in accordance with some embodiments.
Figure 5:
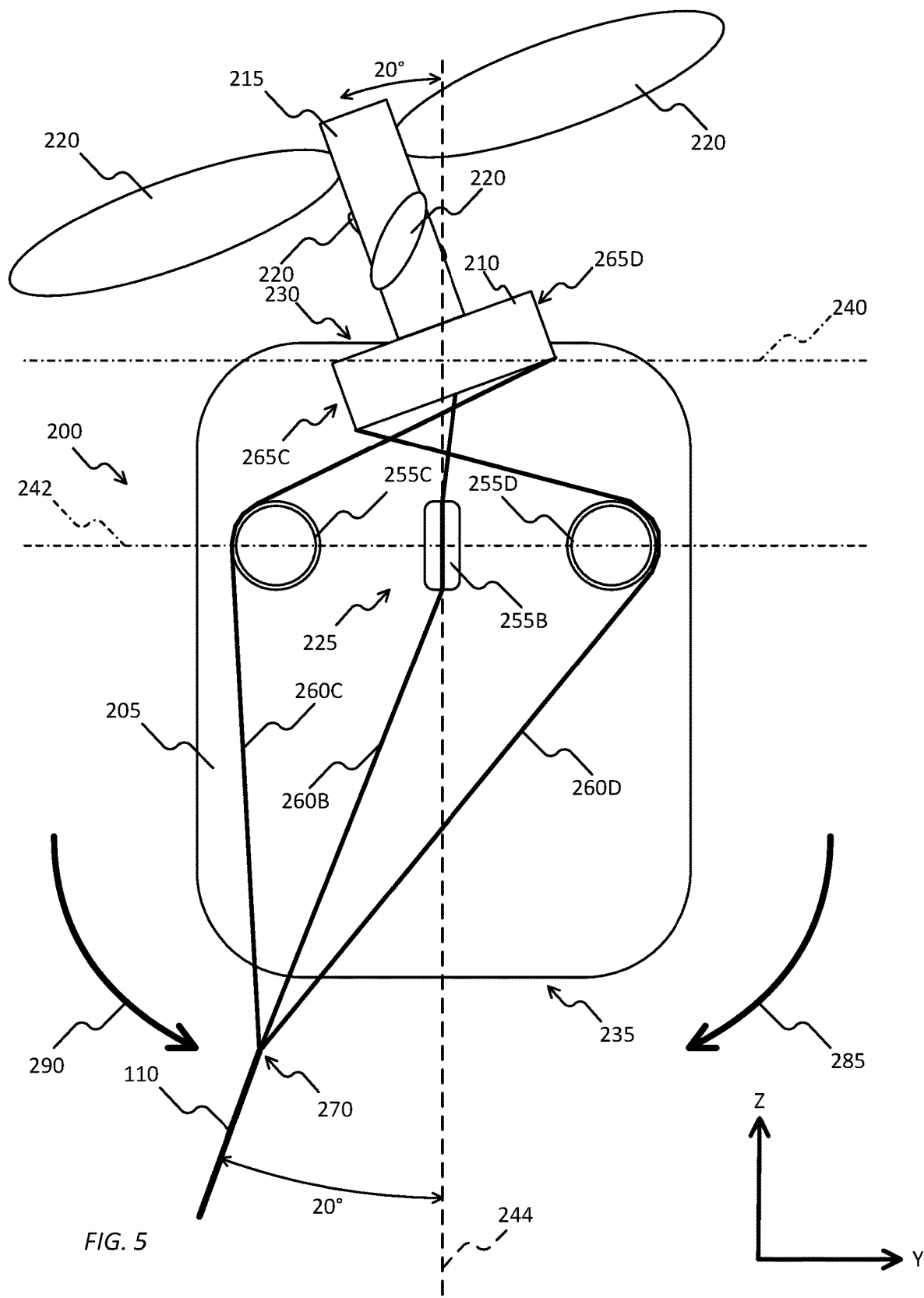
FIG. 5 is a partial sectional view of the unmanned aerial vehicle of FIG. 3 after the tether cable rotates away from the reference axis, in accordance with some embodiments.
Figure 6:
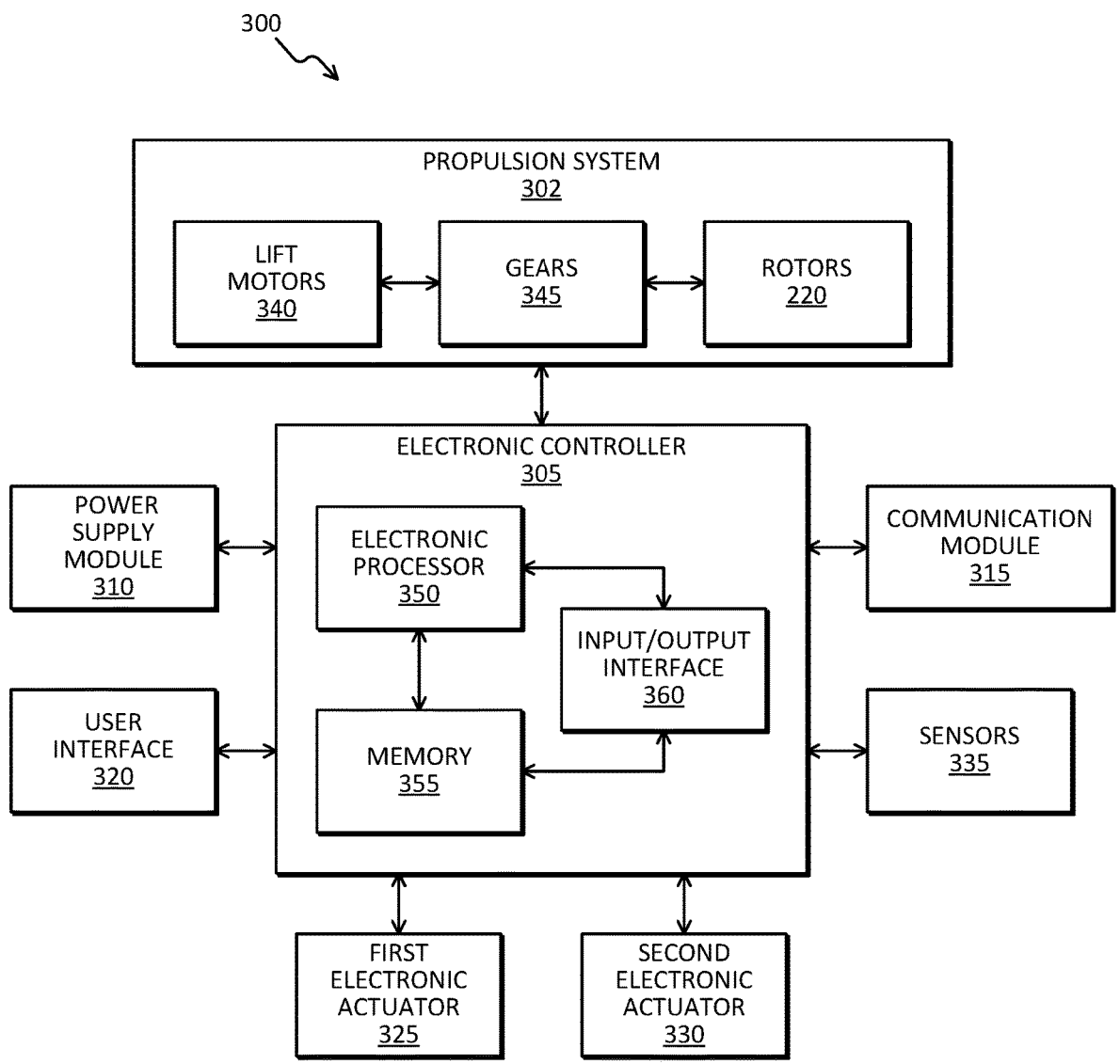
FIG. 6 is a block diagram of an unmanned aerial vehicle including electronic actuators, in accordance with some embodiments.

In some situations, during a disturbance, the tether cable 110 may rotate about the second horizontal axis of rotation 242, as illustrated in FIG. 4. Alternatively or in addition, the tether cable 110 may rotate about the fourth horizontal axis of rotation 248, as illustrated in FIG. 5. Since the tether cable 110 couples the unmanned aerial vehicle 200 to another object, rotation about the second horizontal axis of rotation 242 or the fourth horizontal axis of rotation 248 increases the tension in at least one of the first cable 260A, the second cable 260B, the third cable 260C, and the fourth cable 260D. The pulley system 225 realigns the tether cable 110 with the reference axis after a disturbance.

As illustrated in FIG. 4, the tether cable 110 may rotate in a first direction 275 about the second horizontal axis of rotation 242 (for example, a counter-clockwise direction). Rotation of the tether cable 110 in the first direction 275 increases the tension in the tether cable 110 and the first cable 260A. The increased tension in the first cable 260A provides a tensile force to the second side 265B of the platform 210, which rotates the platform 210 in a second direction 280 about the first horizontal axis of rotation 240 (for example, a clockwise direction). The second direction 280 is opposite from the first direction 275. Alternatively, rotation of the tether cable 110 in the second direction 280 about the second horizontal axis of rotation 242 increases tension in the tether cable 110 and the second cable 260B. The increased tension in the second cable 260B provides a tensile force to the first side 265A of the platform 210, which rotates the platform 210 in the first direction 275 about the first horizontal axis of rotation 240.

As illustrated in FIG. 5, the tether cable 110 may rotate in a third direction 285 about the fourth horizontal axis of rotation 248 (for example, a clockwise direction). Rotation of the tether cable 110 in the third direction 285 increases the tension in the tether cable 110 and the fourth cable 260D. The increased tension in the fourth cable 260D provides a tensile force to the third side 265C of the platform 210, which rotates the platform 210 in a fourth direction 290 about the third horizontal axis of rotation 246 (for example, a counter-clockwise direction). The fourth direction 290 is opposite from the third direction 285. Alternatively, rotation of the tether cable 110 in the fourth direction 290 about the fourth horizontal axis of rotation 248 increases tension in the tether cable 110 and the third cable 260C. The increased tension in the third cable 260C provides a tensile force to the fourth side 265D of the platform 210, which rotates the platform 210 in the third direction 285 about the third horizontal axis of rotation 246.

In some embodiments, the tether cable 110 and the platform 210 rotate the same angular distance, regardless the direction the body 205 rotates. As a first example, as illustrated in FIG. 4, the tether cable 110 rotates about 15 degrees in the first direction 275 and the platform 210 rotates about 15 degrees in the second direction 280. As a second example, as illustrated in FIG. 5, the tether cable 110 rotates about 20 degrees in the third direction 285 and the platform 210 rotates about 20 degrees in the fourth direction 290.

Rotation of the platform 210, with respect to the body 205, changes the orientation of the shaft 215 and the plurality of rotors 220 with respect to the body 205. The orientation of the plurality of rotors 220 after the platform 210 rotates creates a flow of air that realigns the tether cable 110 with the reference axis. In other words, after the platform 210 has rotated the orientation of the plurality of rotors 220, the body 205 moves longitudinally toward the coupling (not shown) in order to decrease the relative angle between the tether cable 110 and the reference axis. As the relative angle between the tether cable 110 and the reference axis decreases, the platform 210 rotates in the opposite direction so that the platform 210 is again orthogonal to the first vertical plane 244 and the second vertical plane 250. The unmanned aerial vehicle 200 returns to an equilibrium position when the tether cable 110 is realigned with the reference axis, and the platform 210 is perpendicular to the first vertical plane 244 and the second vertical plane 250.

In some embodiments, motors are coupled to the pulley system 225 to bring the tether cable 110 back to the equilibrium position. For example, a motor coupled to the first pulley 255A exerts a rotational torque on the first pulley 255A to pull the body 205 of the unmanned aerial vehicle 200 back to the equilibrium position when the tether cable 110 rotates about the second horizontal axis of rotation 242. As a further example, a motor coupled to the third pulley 255C exerts a rotational torque on the third pulley 255C to pull the body 205 of the unmanned aerial vehicle 200 back to the equilibrium position when the tether cable 110 rotates about the fourth horizontal axis of rotation 248.

While in flight, wind may blow against the unmanned aerial vehicle 200. In some embodiments, in order to limit gusts of wind from pivoting the body 205 with respect to the reference axis, one or more weights (not shown) are positioned proximate to the second end 235 of the body 205. The weights provide the unmanned aerial vehicle 200 with a greater moment of inertia, increasing the force required to rotate the body 205 of the unmanned aerial vehicle 200. Alternatively or in addition, the body 205 includes a center of mass proximate to the second end 235 of the body 205.

The unmanned aerial vehicle 200 illustrated in FIGS. 2 through 5 and described herein is provided as one example of such a system. The unmanned aerial vehicle 200 may include fewer, additional, or different components in different configurations than the unmanned aerial vehicle 200 illustrated in FIGS. 2 through 5. For example, in some embodiments, the pulley system 225 includes additional pulleys and cables to control rotation about more than two horizontal axes of rotation. Alternatively, in some embodiments, the pulley system 225 includes fewer pulleys and cables to control rotation about only one horizontal axis of rotation.

Further, the pulley system 225 illustrated in FIGS. 2 through 5 and described herein is just one example of a mechanical actuation system for the unmanned aerial vehicle 105. FIGS. 6 through 10 are diagrams of one example embodiment of an unmanned aerial vehicle 300 including an electronic actuation system. The unmanned aerial vehicle 300 illustrated in FIG. 6 includes a propulsion system 302, an electronic controller 305, a power supply module 310, a communication module 315, a user interface 320, a first electronic actuator 325, a second electronic actuator 330, and a plurality of sensors 335. The unmanned aerial vehicle 300 illustrated in FIGS. 6 through 10 and described herein may include fewer, additional, or different components in different configurations than the unmanned aerial vehicle 300 illustrated in FIGS. 6 through 10. For example, in some embodiments, the unmanned aerial vehicle 300 includes more than one electronic controller.

The propulsion system 302 provides sustained flight of the unmanned aerial vehicle 300. The propulsion system 302 illustrated in FIG. 6 includes lift motors 340, gears 345, and the plurality of rotors 220. The lift motors 340 generate torque which is delivered to the plurality of rotors 220 via the gears 345. The plurality of rotors 220 rotate to provide sustained flight of the unmanned aerial vehicle 300.

The electronic controller 305 includes, among other things, an electronic processor 350 (for example, a microprocessor), memory 355, an input/output interface 360, and a bus. The bus connects various components of the electronic controller 305 including the memory 355 to the electronic processor 350. The memory 355 includes read only memory (ROM), random access memory (RAM), an electrically erasable programmable read-only memory (EEPROM), other non-transitory computer-readable media, or any combination thereof. The electronic processor 350 is configured to retrieve program instructions and data from the memory 355 and execute, among other things, instructions to perform the methods described herein. Alternatively or in addition, the memory 355 is included in the electronic processor 350. The input/output interface 360 includes routines for transferring information between components within the electronic controller 305 and other components internal and external to the unmanned aerial vehicle 300. In some embodiments, the electronic controller 305 also includes, among other things, a plurality of additional passive and active components such as resistors, capacitors, inductors, integrated circuits, and amplifiers. These components are arranged and connected to provide a plurality of electrical functions to the electronic controller 305 including, among other things, filtering, signal conditioning, voltage regulation, or a combination thereof.

The power supply module 310 supplies a nominal AC or DC voltage to the unmanned aerial vehicle 300. In some embodiments, the power supply module 310 is powered by one or more batteries or battery packs included in the unmanned aerial vehicle 300 (for example, rechargeable batteries). Alternatively or in addition, the power supply module 310 is powered by mains power having nominal line voltages between, for example, 100 volts AC and 240 volts AC and frequencies of approximately 50 hertz to 60 hertz. Alternatively or in addition, the tether cable 110 may include one or more electrical conduits that transmit electric power to the power supply module 310. In some embodiments, the power supply module 310 is configured to supply lower voltages to operate circuits and components within the unmanned aerial vehicle 300.

The communication module 315 is configured to provide communications between the unmanned aerial vehicle 300 and other components within an unmanned aerial system (for example, remote servers). The communication module 315 transmits signals to one or more communication networks and receives signals from the communication networks wirelessly, via wires, via fibers, or a combination thereof. In some embodiments, signals include, for example, data, data packets, or a combination thereof. The communication networks may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network. In some embodiments, the communication module 315 receives and transmits data via the tether cable 110. For example, the tether cable 110 may include wires, fibers, or both.

The user interface 320 is included to control the operation of the unmanned aerial vehicle 300. The user interface 320 can include any combination of digital and analog input devices required to achieve a desired level of control for the unmanned aerial vehicle 300. For example, the user interface 320 can include a touch-screen display, a plurality of knobs, dials, switches, buttons, and the like.

Figure 7:
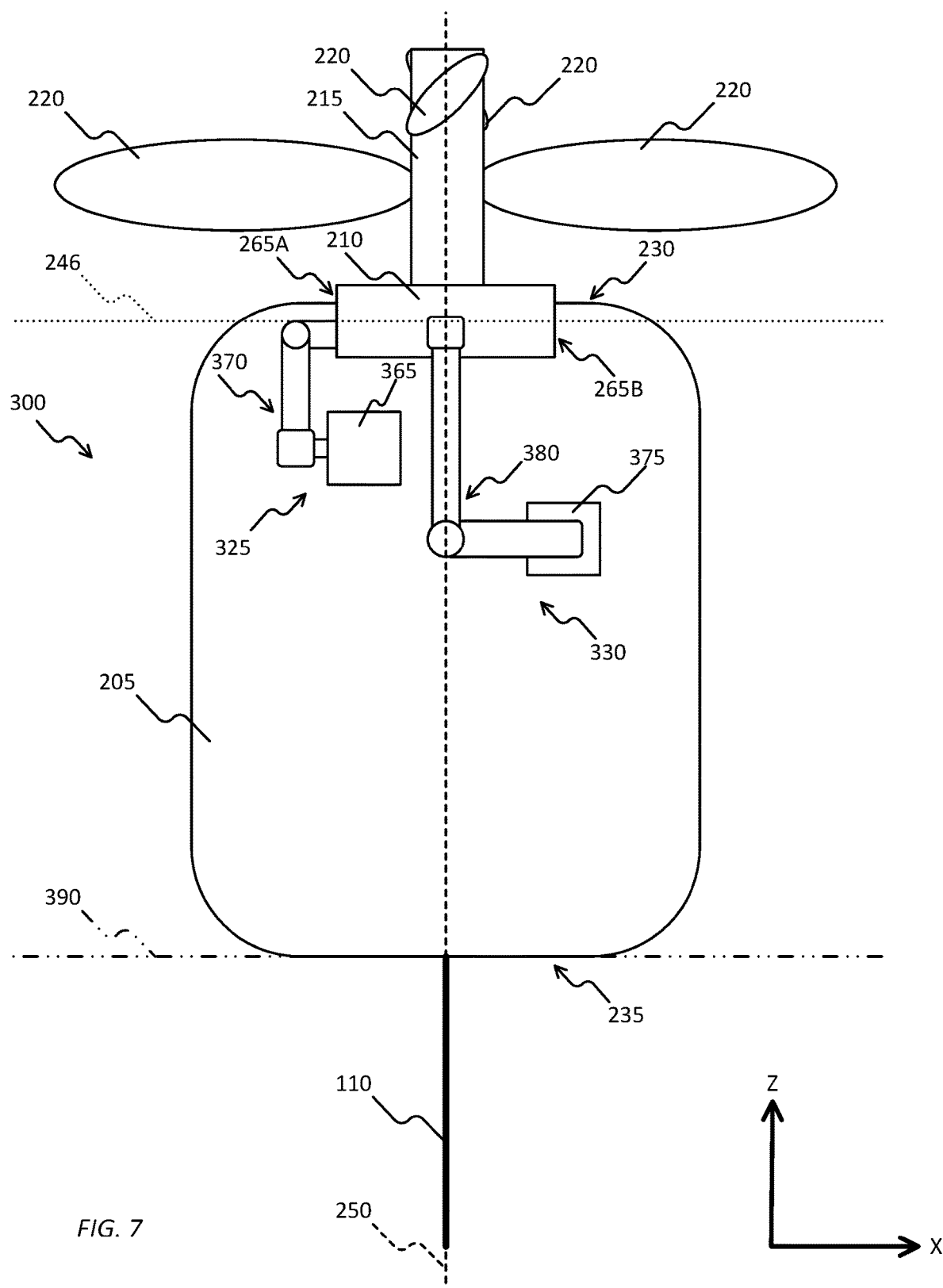
FIG. 7 is a partial sectional view of the unmanned aerial vehicle of FIG. 6 including a tether cable at rest along a reference axis, in accordance with some embodiments.

As illustrated in FIG. 7, the unmanned aerial vehicle 300 further includes the tether cable 110, the body 205, the platform 210, and the shaft 215. Also as illustrated in FIG. 7, the first electronic actuator 325 includes a first motor 365 and a first plurality of arms 370. The first plurality of arms 370 are coupled to the first motor 365 and to the first side 265A of the platform 210 such that rotation of first motor 365 causes rotation of the platform 210 about the first horizontal axis of rotation 240. The electronic controller 305 drives the first electronic actuator 325 to change the position of the platform 210 about the first horizontal axis of rotation 240. For example, the electronic controller 305 sends one or more control signals to the first electronic actuator 325 which causes the first motor 365 to rotate.

The second electronic actuator 330 includes a second motor 375 and a second plurality of arms 380. The second plurality of arms 380 are coupled to the second motor 375 and to the third side 265C of the platform 210 such that rotation of second motor 375 causes rotation of the platform 210 about the third horizontal axis of rotation 246. The electronic controller 305 drives the second electronic actuator 330 to change the position of the platform 210 about the third horizontal axis of rotation 246. For example, the electronic controller 305 sends one or more control signals to the second electronic actuator 330 which causes the second motor 375 to rotate.

Figure 8:
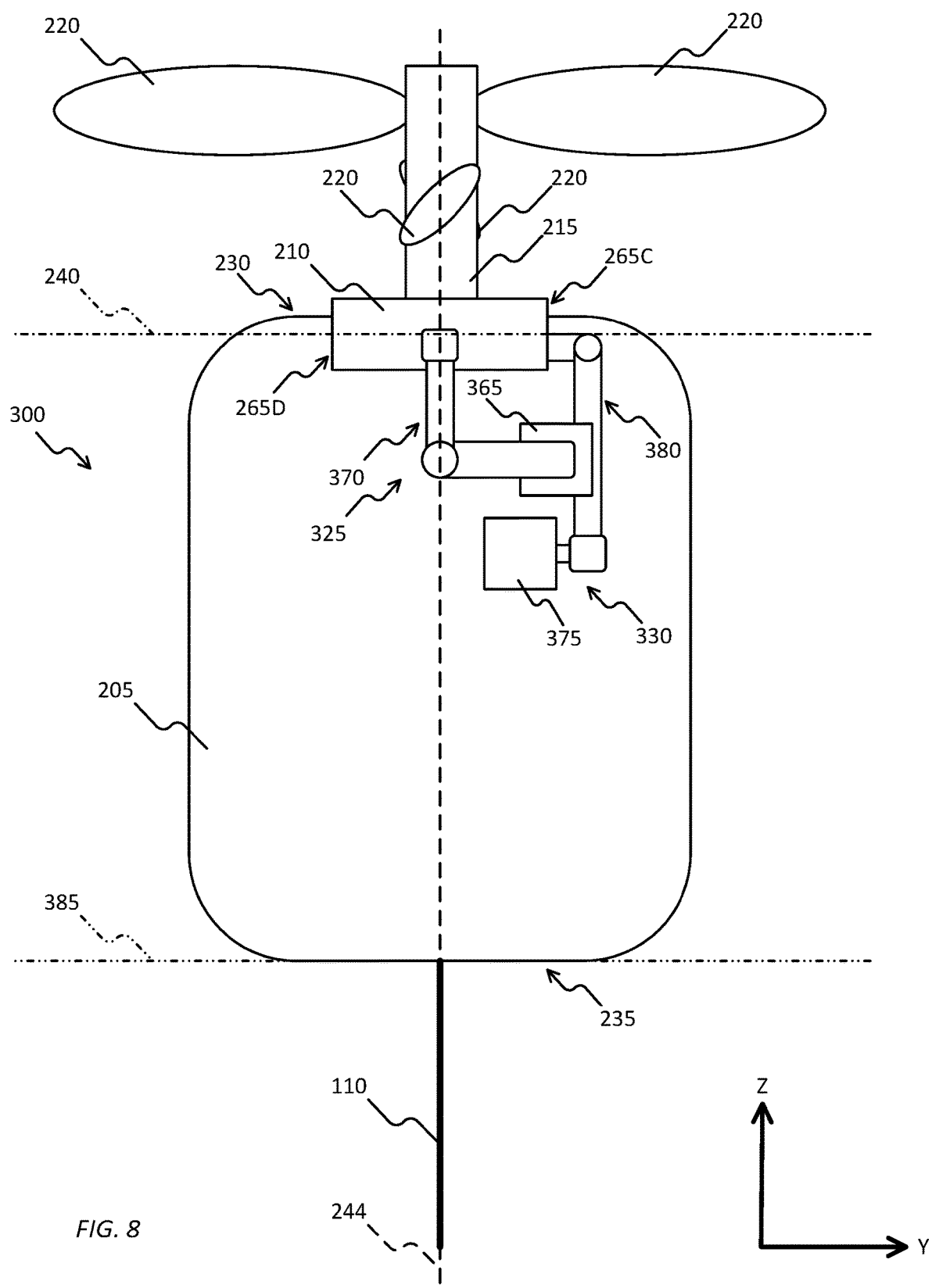
FIG. 8 is a partial sectional view of the unmanned aerial vehicle of FIG. 7 rotated 90 degrees about the Z-axis, in accordance with some embodiments.
Figure 9:
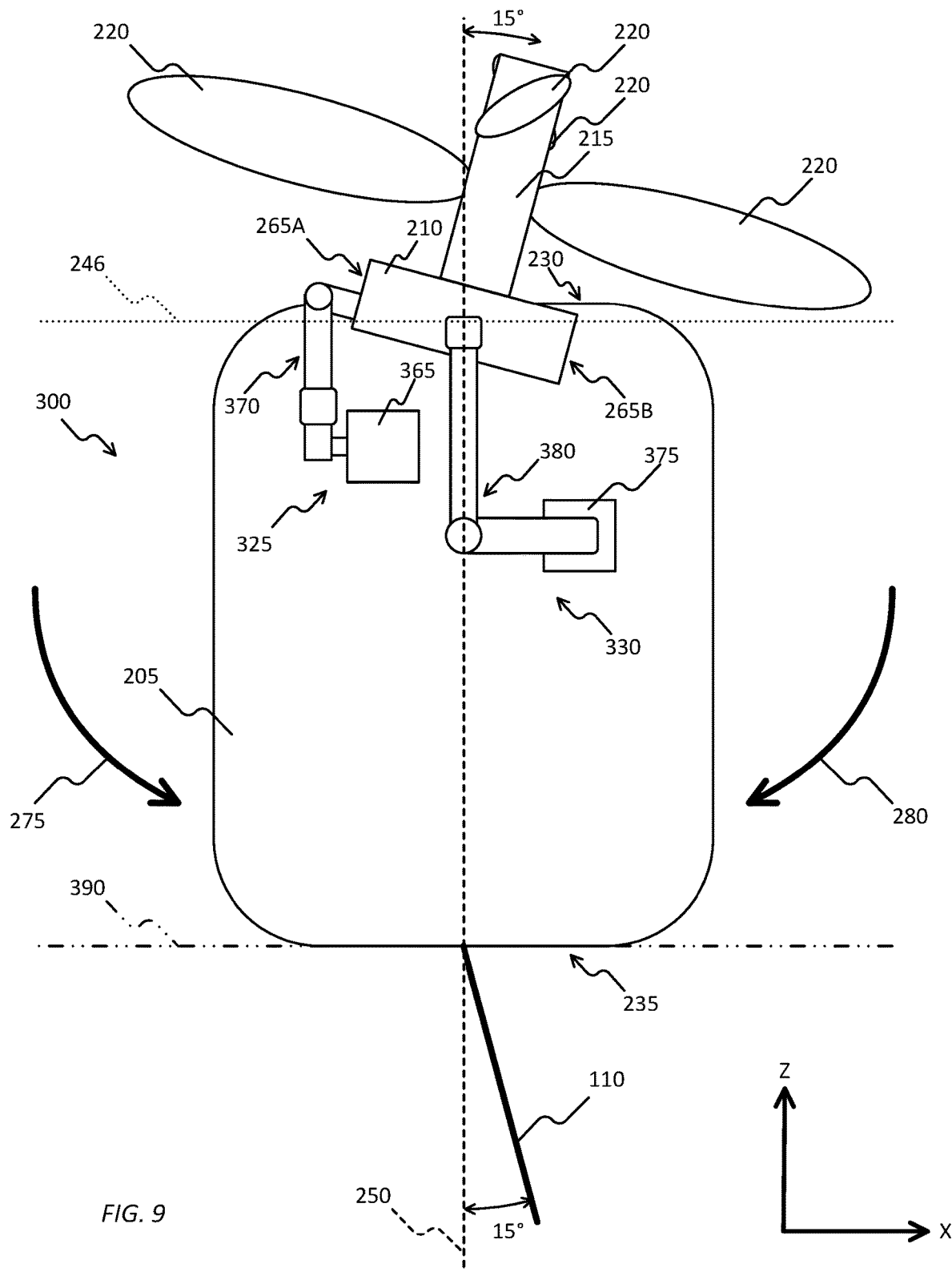
FIG. 9 is a partial sectional view of the unmanned aerial vehicle of FIG. 7 after the tether cable rotates away from the reference axis, in accordance with some embodiments.
Figure 10:
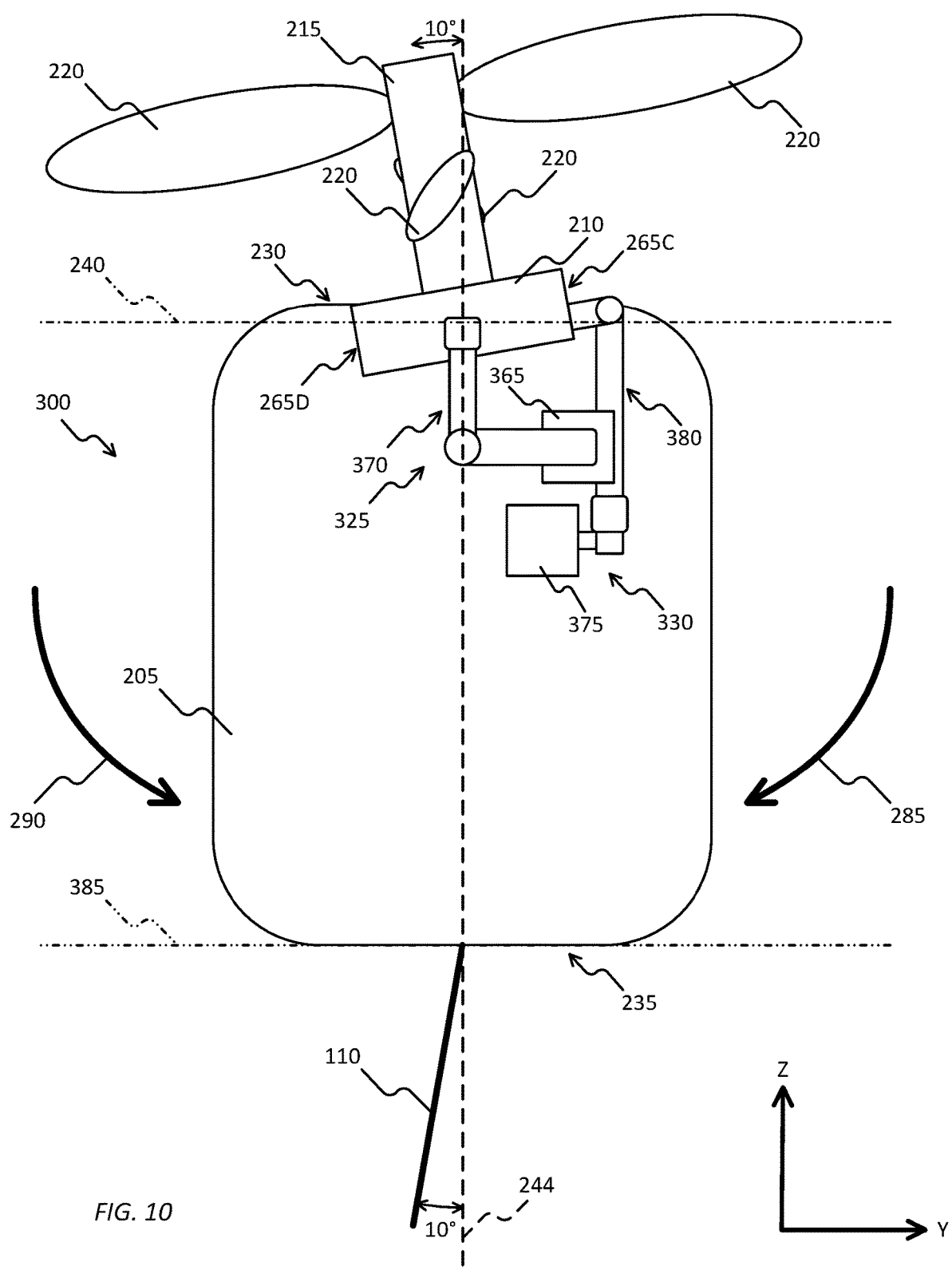
FIG. 10 is a partial sectional view of the unmanned aerial vehicle of FIG. 8 after the tether cable rotates away from the reference axis, in accordance with some embodiments.
Figure 11:
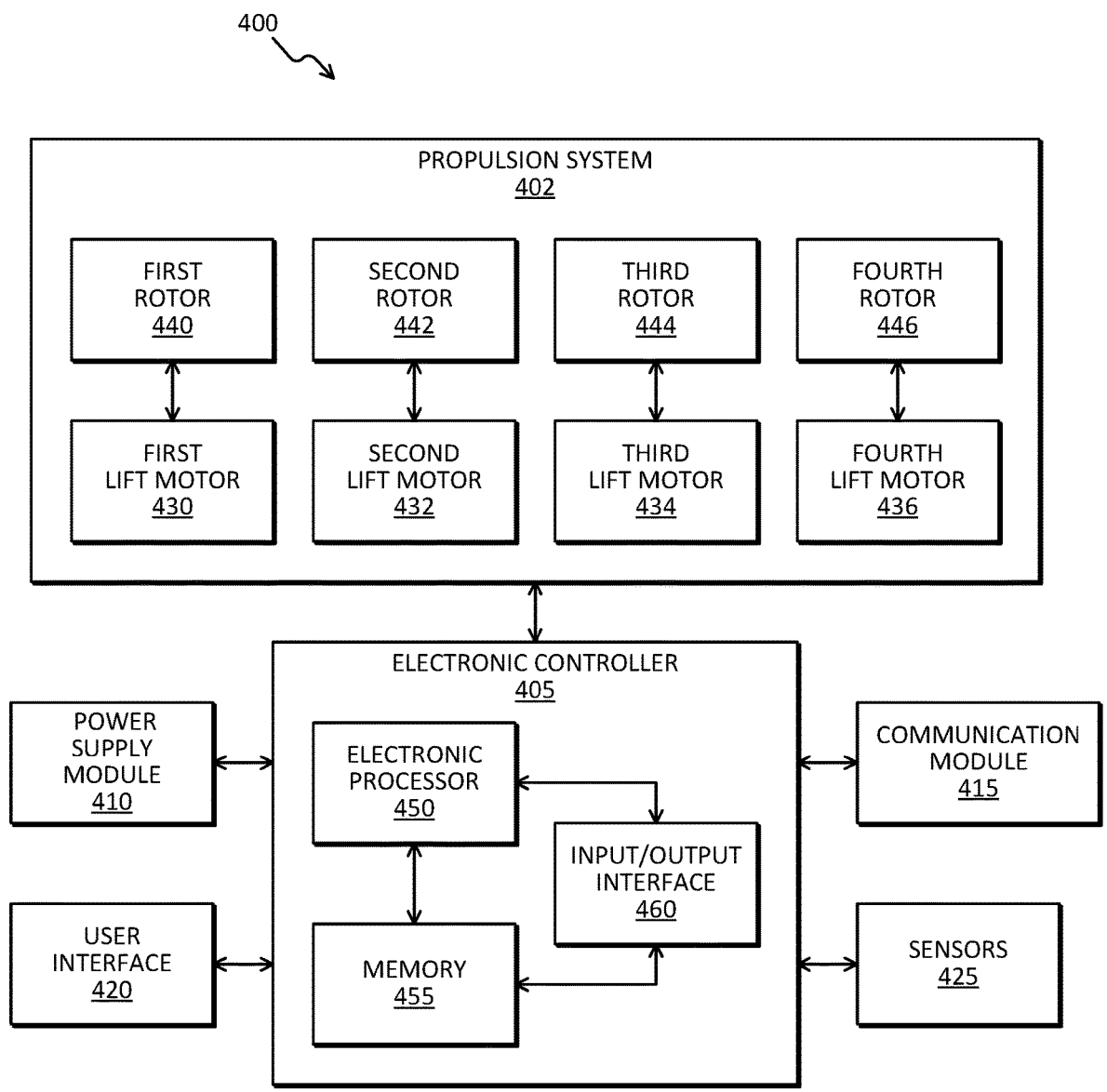
FIG. 11 is a block diagram of an unmanned aerial vehicle including a variable rotor thrust stabilization system, in accordance with some embodiments.

The tether cable 110 is coupled to the body 205 such that the tether cable 110 is rotatable relative to the body 205 about a fifth horizontal axis of rotation 385 (illustrated in FIGS. 8 and 10). The fifth horizontal axis of rotation 385 is normal to the first vertical plane 244. The tether cable 110 is also rotatable relative to the body 205 about a sixth horizontal axis of rotation 390 (illustrated in FIGS. 7 and 9). The sixth horizontal axis of rotation 390 is normal to the second vertical plane 250.

The plurality of sensors 335 include sensors for determining the movement of the tether cable 110 relative to the body 205. In some embodiments, the plurality of sensors 335 include one or more sensors for determining the relative angle between the tether cable 110 and the body 205 (for example, rotary encoders, tilt sensors, and angular position sensors). Alternatively or in addition, the plurality of sensors 335 include one or more strain gauges positioned, for example, proximate to the second end 235 of the body 205 (not shown). In some embodiments, the tether cable 110 is coupled to a deformable portion on the second end 235 of the body 205. The deformable portion on the second end 235 of the body 205 deforms as the tension in the tether cable 110 changes (for example, due the movement of the tether cable 110). The one or more strain gauges determine measurements of the deformation. The electronic processor 350 determines the angular displacement of the tether cable 110 relative to the reference axis based on the measurements of the one or more strain gauges.

In some embodiments, the plurality of sensors 335 include sensors for determining the tension of the tether cable 110. For example, the plurality of sensors 335 can include cable tension meters, dynamometers, strain gauges, or a combination thereof.

In some embodiments, the plurality of sensors 335 include sensors for determining the location, the position, the motion, and the orientation of the unmanned aerial vehicle 300. For example, the plurality of sensors 335 can include global positioning system (GPS) sensors, barometers, accelerometers, gyroscopes, magnetometers, distance sensors (for example, ultrasonic sensors, radar sensors, and LIDAR sensors), or a combination thereof.

In some embodiments, the plurality of sensors 335 include sensors for recording the environment around the unmanned aerial vehicle 300. For example, the plurality of sensors 335 can include image sensors (for example, cameras) and audio sensors (for example, microphones), or both. In some embodiments, the image and/or audio data captured by the sensors 335 can be stored with the memory 355 for future access. Alternatively or in addition, the image and/or audio data captured by the sensors 335 can be transmitted to an external electronic device (for example, via the tether cable 110). Attentively or in addition, the image and/or audio data captured by the sensors 335 can be transmitted to emergency responders to assist in emergency operations. For example, when the unmanned aerial vehicle 300 is deployed from a car after a collision, emergency responders can use the image and/or audio data captured by the sensors 335 to determine the extent of injuries suffered by occupants of the car.

At rest, the tether cable 110 extends away from the body 205 along the reference axis (i.e., along the intersection of the first vertical plane 244 and the second vertical plane 250), as illustrated in FIGS. 7 and 8. When the tether cable 110 becomes misaligned with the reference axis, the electronic controller 305 drives the first electronic actuator 325 and the second electronic actuator 330 to rotate the platform 210 such that the orientation of the plurality of rotors 220 creates a flow of air that realigns the tether cable 110 with the reference axis. The electronic controller 305 determines movement of the tether cable 110 based at least in part on data from the plurality of sensors 335.

As illustrated in FIG. 9, the tether cable 110 may rotate in the first direction 275 about the fifth horizontal axis of rotation 385 (for example, a counter-clockwise direction). Responsive to detecting rotation of the tether cable 110 in the first direction 275 about the fifth horizontal axis of rotation 385, the electronic controller 305 drives the first electronic actuator 325 to rotate the platform 210 in the second direction 280 about the first horizontal axis of rotation 240 (for example, a clockwise direction). The tether cable 110 may also rotate in the second direction 280 about the fifth horizontal axis of rotation 385. Responsive to detecting rotation of the tether cable 110 in the second direction 280 about the fifth horizontal axis of rotation 385, the electronic controller 305 drives the first electronic actuator 325 to rotate the platform 210 in the first direction 275 about the first horizontal axis of rotation 240.

As illustrated in FIG. 10, the tether cable 110 may rotate in the third direction 285 about the sixth horizontal axis of rotation 390 (for example, a clockwise direction). Responsive to detecting rotation of the tether cable 110 in the third direction 285 about the sixth horizontal axis of rotation 390, the electronic controller 305 drives the second electronic actuator 330 to rotate the platform 210 in the fourth direction 290 about the third horizontal axis of rotation 246 (for example, a counter-clockwise direction). The tether cable 110 may also rotate in the fourth direction 290 about the sixth horizontal axis of rotation 390. Responsive to detecting rotation of the tether cable 110 in the fourth direction 290 about the sixth horizontal axis of rotation 390, the electronic controller 305 drives the second electronic actuator 330 to rotate the platform 210 in the third direction 285 about the third horizontal axis of rotation 246.

In some embodiments, the electronic controller 305 drives the first electronic actuator 325 and the second electronic actuator 330 to rotate the platform 210 the same angular distance as the tether cable 110. As a first example, as illustrated in FIG. 9, the electronic controller 305 rotates the platform 210 about 15 degrees in the second direction 280 when the tether cable 110 rotates about 15 degrees in the first direction 275. As a second example, as illustrated in FIG. 10, the electronic controller 305 rotates the platform 210 about 10 degrees in the fourth direction 290 when the tether cable 110 rotates about 10 degrees in the third direction 285.

Slack in the tether cable 110 between the body 205 and an external coupling can cause a portion of the tether cable 110 to become caught on an obstruction (for example, a power line pole). Thus, in some embodiments, the electronic controller 305 adjusts the angular speeds (for example, the rotations per minute (RPM)) of the plurality of rotors 220 to keep the tether cable 110 taut (i.e., straight). For example, the electronic controller 305 may determine the tension in the tether cable 110 using the plurality of sensors 335 and increase the angular speeds of the plurality of rotors 220 when the tension of the tether cable 110 decreases. In addition, the electronic controller 305 may decrease the angular speeds of the plurality of rotors 220 when the tension of the tether cable 110 increases. In some embodiments, the electronic controller 305 adjusts the angular speeds of the plurality of rotors 220 to keep the tension of the tether cable 110 within a predetermined range. For example, the electronic controller 305 may increase the angular speeds of the plurality of rotors 220 to keep the tension of the tether cable 110 above a predetermined minimum amount of tension at which the tether cable 110 may become slack. In addition, the electronic controller 305 may decrease the angular speeds of the plurality of rotors 220 to keep the tension of the tether cable 110 below a predetermined maximum amount of tension at which the tether cable 110 may break.

In some embodiments, the unmanned aerial vehicle 200 illustrated in FIGS. 2 through 5 includes all or some of the components of the unmanned aerial vehicle 300 illustrated in FIGS. 6 through 10. For example, the unmanned aerial vehicle 200 may include an electronic controller and sensors configured to perform all or some of the functions described herein as being performed by the electronic controller 305 and the plurality of sensors 335. In some embodiments, the unmanned aerial vehicle 200 determines the tension in the tether cable 110 by measuring torque on the first pulley 255A, the second pulley 255B, the third pulley 255C, and the fourth pulley 255D using, for example, torque sensors.

FIGS. 11 through 17 are diagrams of one example embodiment of an unmanned aerial vehicle 400 including a variable rotor thrust stabilization system. The unmanned aerial vehicle 400 illustrated in FIG. 11 includes a propulsion system 402, an electronic controller 405, a power supply module 410, a communication module 415, a user interface 420, and a plurality of sensors 425. The unmanned aerial vehicle 400 illustrated in FIGS. 11 through 17 and described herein may include fewer, additional, or different components in different configurations than the unmanned aerial vehicle 400 illustrated in FIGS. 11 through 17. For example, in some embodiments, the unmanned aerial vehicle 400 includes more than one electronic controller.

The propulsion system 402 provides sustained flight of the unmanned aerial vehicle 400. The propulsion system 402 illustrated in FIG. 11 includes four lift motors (for example, a first lift motor 430, a second lift motor 432, a third lift motor 434, and a fourth lift motor 436) and four rotors (for example, a first rotor 440, a second rotor 442, a third rotor 444, and a fourth rotor 446). Each of the four lift motors 430-436 generates torque which is delivered to one of the four rotors 440-446. For example, the first lift motor 430 generates torque which is delivered to the first rotor 440. The four rotors 440-446 rotate to provide sustained flight of the unmanned aerial vehicle 400.

The electronic controller 405 includes, among other things, an electronic processor 450 (for example, a microprocessor), memory 455, an input/output interface 460, and a bus. The bus connects various components of the electronic controller 405 including the memory 455 to the electronic processor 450. The memory 455 includes read only memory (ROM), random access memory (RAM), an electrically erasable programmable read-only memory (EEPROM), other non-transitory computer-readable media, or any combination thereof. The electronic processor 450 is configured to retrieve program instructions and data from the memory 455 and execute, among other things, instructions to perform the methods described herein. Alternatively or in addition, the memory 455 is included in the electronic processor 450. The input/output interface 460 includes routines for transferring information between components within the electronic controller 405 and other components internal and external to the unmanned aerial vehicle 400. In some embodiments, the electronic controller 405 also includes, among other things, a plurality of additional passive and active components such as resistors, capacitors, inductors, integrated circuits, and amplifiers. These components are arranged and connected to provide a plurality of electrical functions to the electronic controller 405 including, among other things, filtering, signal conditioning, voltage regulation, or a combination thereof.

The power supply module 410 supplies a nominal AC or DC voltage to the unmanned aerial vehicle 400. In some embodiments, the power supply module 410 is powered by one or more batteries or battery packs included in the unmanned aerial vehicle 400 (for example, rechargeable batteries). Alternatively or in addition, the power supply module 410 is powered by mains power having nominal line voltages between, for example, 100 volts AC and 240 volts AC and frequencies of approximately 50 hertz to 60 hertz. Alternatively or in addition, the tether cable 110 may include one or more electrical conduits that transmit electric power to the power supply module 410. In some embodiments, the power supply module 410 is configured to supply lower voltages to operate circuits and components within the unmanned aerial vehicle 400.

The communication module 415 is configured to provide communications between the unmanned aerial vehicle 400 and other components within an unmanned aerial system (for example, remote servers). The communication module 415 transmits signals to one or more communication networks and receives signals from the communication networks wirelessly, via wires, via fibers, or a combination thereof. In some embodiments, signals include, for example, data, data packets, or a combination thereof. The communication networks may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network. In some embodiments, the communication module 415 receives and transmits data via the tether cable 110. For example, the tether cable 110 may include wires, fibers, or both.

The user interface 420 is included to control the operation of the unmanned aerial vehicle 400. The user interface 420 can include any combination of digital and analog input devices required to achieve a desired level of control for the unmanned aerial vehicle 400. For example, the user interface 420 can include a touch-screen display, a plurality of knobs, dials, switches, buttons, and the like.

Figure 12:
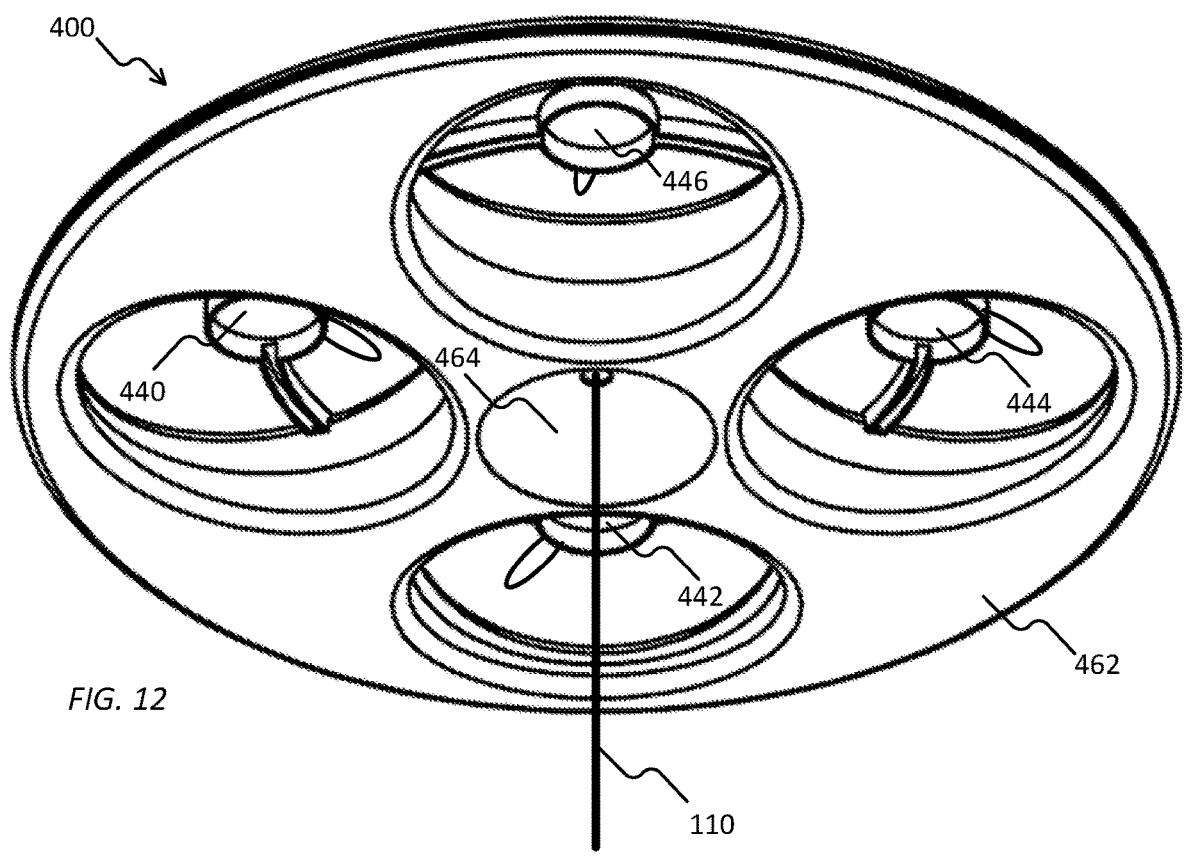
FIG. 12 is a perspective view of an underside of the unmanned aerial vehicle of FIG. 11, in accordance with some embodiments.
Figure 13:
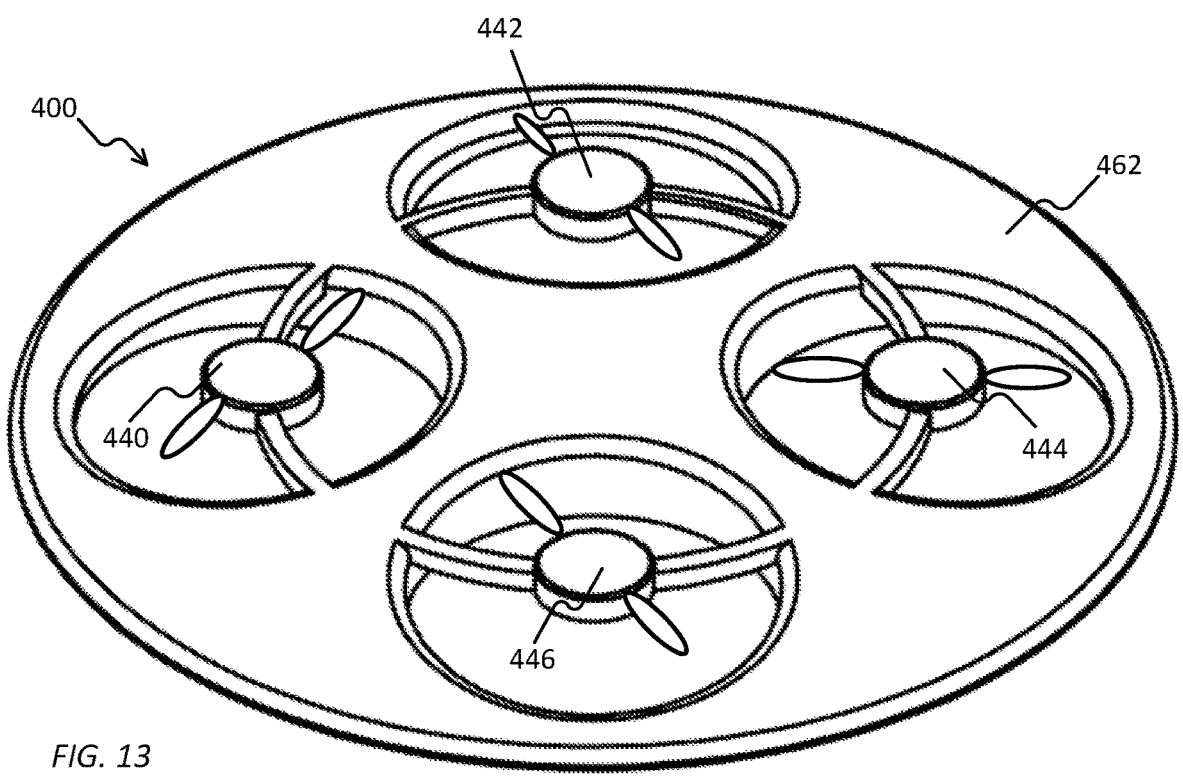
FIG. 13 is a perspective view of a topside of the unmanned aerial vehicle of FIG. 11, in accordance with some embodiments.

As illustrated in FIGS. 12 and 13, the unmanned aerial vehicle 400 further includes the tether cable 110, a body 462, and a recess 464. Also, as illustrated in FIGS. 12 and 13, each of the four rotors 440-446 are positioned in different quadrants of the body 462.

Figure 14:
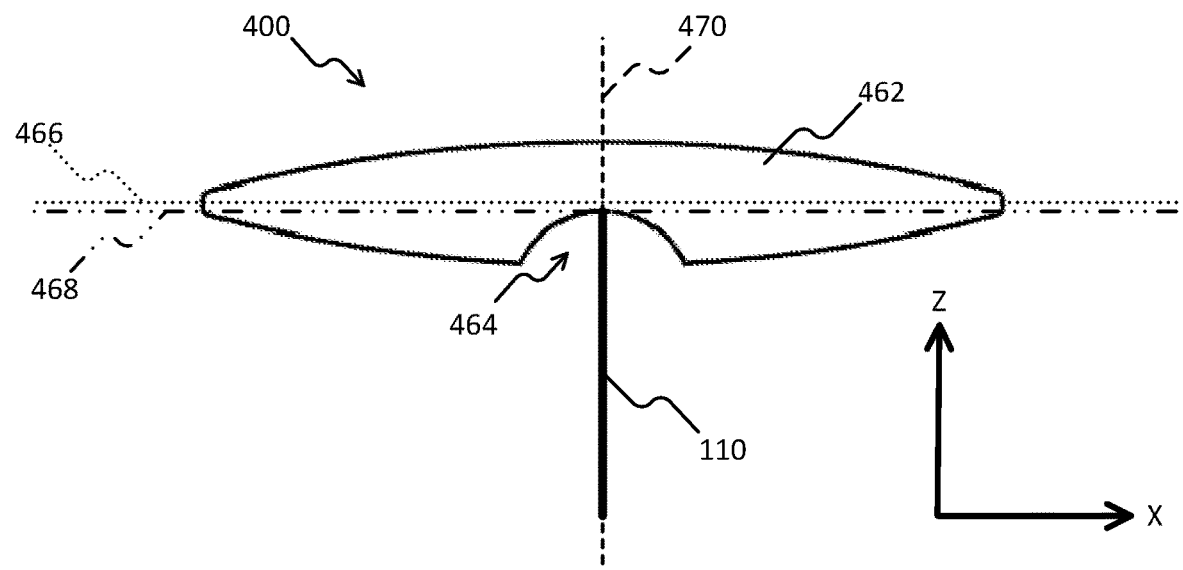
FIG. 14 is a partial sectional view of the unmanned aerial vehicle of FIG. 11 including a tether cable at rest along a reference axis, in accordance with some embodiments.
Figure 16:
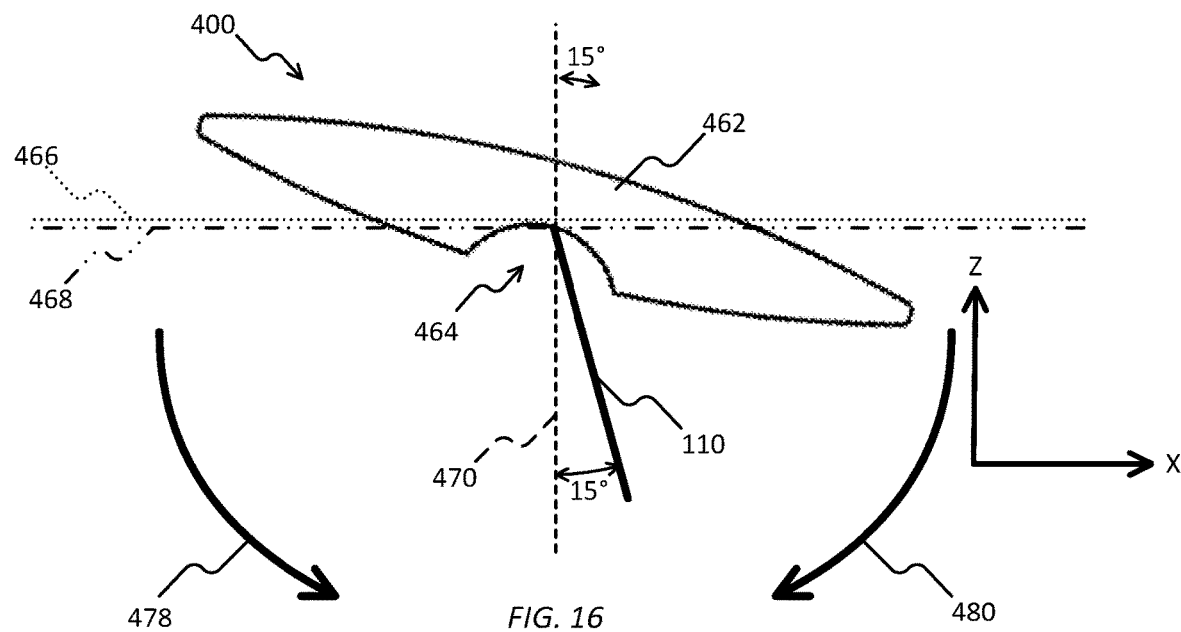
FIG. 16 is a partial sectional view of the unmanned aerial vehicle of FIG. 14 after the tether cable rotates away from the reference axis, in accordance with some embodiments.

The body 462 is rotatable about a first horizontal axis of rotation 466 (illustrated in FIGS. 14 and 16). The tether cable 110 is coupled to the body 462 such that the tether cable 110 is rotatable relative to the body 462 about a second horizontal axis of rotation 468 (illustrated in FIGS. 14 and 16). The first horizontal axis of rotation 466 and the second horizontal axis of rotation 468 are both normal to a first vertical plane 470 extending through the body 462.

Figure 15:
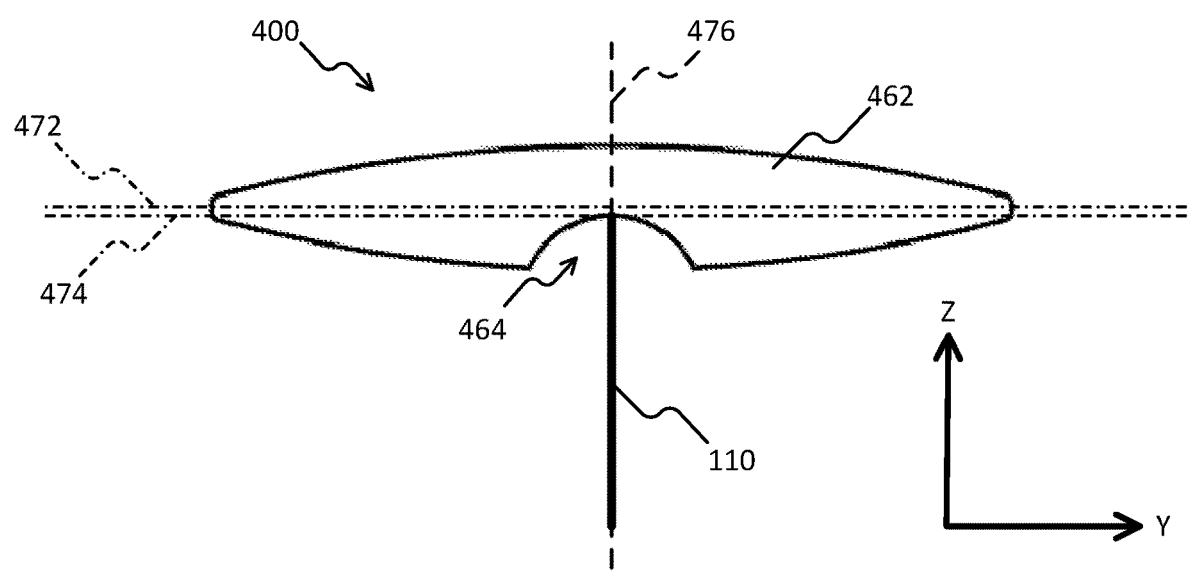
FIG. 15 is a partial sectional view of the unmanned aerial vehicle of FIG. 14 rotated 90 degrees about the Z-axis, in accordance with some embodiments.
Figure 17:
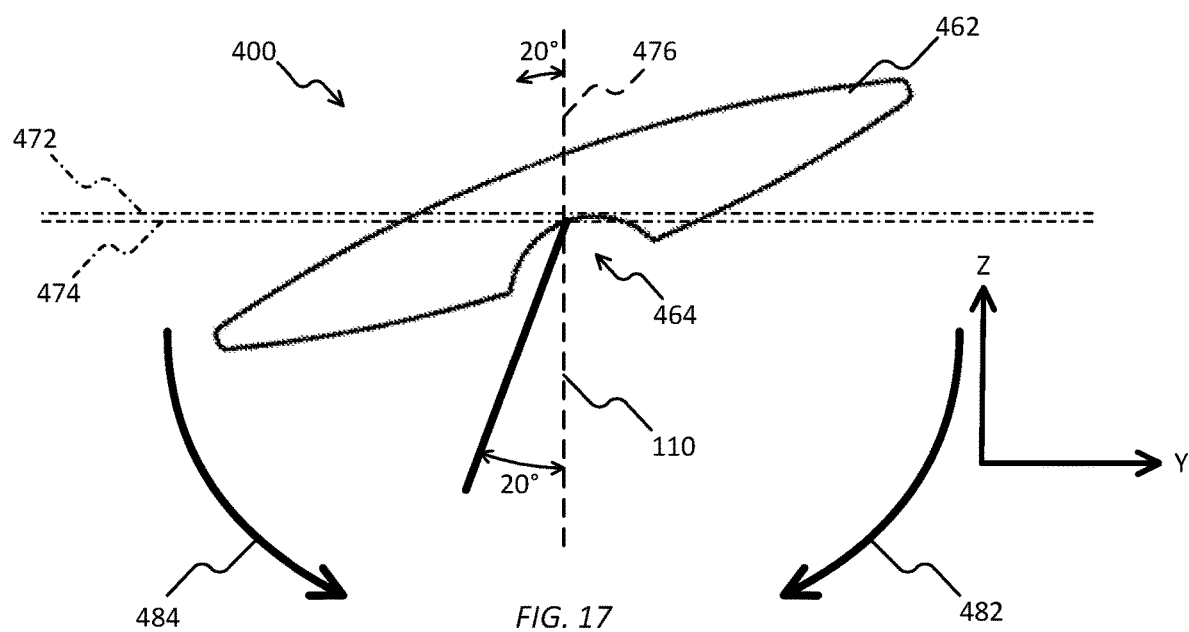
FIG. 17 is a partial sectional view of the unmanned aerial vehicle of FIG. 15 after the tether cable rotates away from the reference axis, in accordance with some embodiments.

The body 462 is also rotatable about a third horizontal axis of rotation 472 (illustrated in FIGS. 15 and 17). The tether cable 110 is also rotatable relative to the body 462 about a fourth horizontal axis of rotation 474 (illustrated in FIGS. 15 and 17). The third horizontal axis of rotation 472 and the fourth horizontal axis of rotation 474 are both normal to a second vertical plane 476 extending through the body 462. The second vertical plane 476 is orthogonal to the first vertical plane 470. The first horizontal axis of rotation 466 is orthogonal to the third horizontal axis of rotation 472. The second horizontal axis of rotation 468 is orthogonal to the fourth horizontal axis of rotation 474.

In the embodiment illustrated, the recess 464 is domed-shaped and the tether cable 110 is coupled near a crown of the recess 464. This configuration enables the tether cable 110 to be coupled to body 462 as close as possible to the center of gravity of the body 462. In other words, the offset between the first horizontal axis of rotation 466 and the second horizontal axis of rotation 468 is minimized. In addition, this configuration minimizes the offset between the third horizontal axis of rotation 472 and the fourth horizontal axis of rotation 474.

While in flight, the first rotor 440 and the third rotor 444 rotate in a direction that is opposite from the direction of rotation of the second rotor 442 and the fourth rotor 446. For example, the first rotor 440 and the third rotor 444 clockwise and the second rotor 442 and the fourth rotor 446 rotate counter-clockwise. In addition, while hovering as illustrated in FIGS. 14 and 15, the angular speed of each of the four rotors 440-446 is equal to each other.

At rest, the tether cable 110 extends away from the body 462 along the reference axis (i.e., along the intersection of the first vertical plane 470 and the second vertical plane 476), as illustrated in FIGS. 14 and 15. When the tether cable 110 becomes misaligned with the reference axis, the electronic controller 405 adjusts the angular speeds of the four rotors 440-446 to rotate the body 462 such that the orientation of the four rotors 440-446 creates a flow of air that realigns the tether cable 110 with the reference axis. The electronic controller 405 determines movement of the tether cable 110 based at least in part on data from the plurality of sensors 425. The plurality of sensors 425 includes one or more sensors such as any combination of the sensors described above in relation to the plurality of sensors 335. For example, the plurality of sensors can includes sensors for determining the movement of the tether cable 110 relative to the body 462 and the tension of the tether cable 110.

As illustrated in FIG. 16, the tether cable 110 may rotate in a first direction 478 about the second horizontal axis of rotation 468 (for example, a counter-clockwise direction). Responsive to detecting rotation of the tether cable 110 in the first direction 478 about the second horizontal axis of rotation 468, the electronic controller 405 adjusts the angular speeds of the four rotors 440-446 to rotate the body 462 in a second direction 480 about the first horizontal axis of rotation 466 (for example, a clockwise direction). For example, the electronic controller 405 drives the first lift motor 430 and the fourth lift motor 436 to increase the angular speeds of the first rotor 440 and the fourth rotor 446, and drives the second lift motor 432 and the third lift motor 434 to decrease the angular speeds of the second rotor 442 and the third rotor 444.

In some embodiments, the electronic controller 405 adjusts the angular speeds of the four rotors 440-440 such that the total thrust remains constants. For example, the electronic controller 405 decreases the angular speeds of the second rotor 442 and the third rotor 444 by amounts that are substantially equal to the amounts of increase of the angular speeds of the first rotor 440 and the fourth rotor 446.

The tether cable 110 may also rotate in the second direction 480 about the second horizontal axis of rotation 468. Responsive to detecting rotation of the tether cable 110 in the second direction 480 about the second horizontal axis of rotation 468, the electronic controller 405 adjusts the angular speeds of the four rotors 440-446 to rotate the body 462 in the first direction 478 about the first horizontal axis of rotation 466. For example, the electronic controller 405 drives the first lift motor 430 and the fourth lift motor 436 to decrease the angular speeds of the first rotor 440 and the fourth rotor 446, and drives the second lift motor 432 and the third lift motor 434 to increase the angular speeds of the second rotor 442 and the third rotor 444.

As illustrated in FIG. 17, the tether cable 110 may rotate in a third direction 482 about the fourth horizontal axis of rotation 474 (for example, a clockwise direction). Responsive to detecting rotation of the tether cable 110 in the third direction 482 about the fourth horizontal axis of rotation 474, the electronic controller 405 adjusts the angular speeds of the four rotors 440-446 to rotate the body 462 in a fourth direction 484 about the third horizontal axis of rotation 472 (for example, a counter-clockwise direction). For example, the electronic controller 405 drives the first lift motor 430 and the second lift motor 432 to decrease the angular speeds of the first rotor 440 and the second rotor 442, and drives the third lift motor 434 and the fourth lift motor 436 to increase the angular speeds of the third rotor 444 and the fourth rotor 446.

The tether cable 110 may also rotate in the fourth direction 484 about the fourth horizontal axis of rotation 474. Responsive to detecting rotation of the tether cable 110 in the fourth direction 484 about the fourth horizontal axis of rotation 474, the electronic controller 405 adjusts the angular speeds of the four rotors 440-446 to rotate the body 462 in the third direction 482 about the third horizontal axis of rotation 472. For example, the electronic controller 405 drives the first lift motor 430 and the second lift motor 432 to increase the angular speeds of the first rotor 440 and the second rotor 442, and drives the third lift motor 434 and the fourth lift motor 436 to decrease the angular speeds of the third rotor 444 and the fourth rotor 446.

In some embodiments, the electronic controller 405 adjusts the angular speeds of the four rotors 440-446 based in part on the amount of rotation of the tether cable 110. In other words, the electronic controller 405 adjusts the angular speeds of the four rotors 440-446 greater when the tether cable 110 rotates farther away from the reference axis. For example, the electronic controller 405 adjusts the angular speeds of the four rotors 440-446 by small amounts when the angle between the tether cable 110 and the references axis is small, and adjusts the angular speeds of the four rotors 440-446 by large amounts when the angle between the tether cable 110 and the reference axis is large.

In some embodiments, the electronic controller 405 adjusts the angular speeds of the four rotors 440-446 to rotate the body 462 the same angular distance as the tether cable 110. As a first example, as illustrated in FIG. 16, the electronic controller 405 adjusts the angular speeds of the four rotors 440-446 to rotate the body 462 about 15 degrees in the second direction 480 when the tether cable 110 rotates about 15 degrees in the first direction 478. As a second example, as illustrated in FIG. 17, the electronic controller 405 adjusts the angular speeds of the four rotors 440-446 to rotate the body 462 about 20 degrees in the fourth direction 484 when the tether cable 110 rotates about 20 degrees in the third direction 482.

In some embodiments, the electronic controller 405 adjusts the angular speeds of the four rotors 440-446 to keep the tether cable 110 taut (i.e., straight). For example, the electronic controller 405 may determine the tension in the tether cable 110 using the plurality of sensors 425 and increase the angular speeds of the four rotors 440-446 when the tension of the tether cable 110 decreases. In addition, the electronic controller 405 may decrease the angular speeds of the four rotors 440-446 when the tension of the tether cable 110 increases. In some embodiments, the electronic controller 405 adjusts the angular speeds of the four rotors 440-446 to keep the tension of the tether cable 110 within a predetermined range. For example, the electronic controller 405 may increase the angular speeds of the four rotors 440-446 to keep the tension of the tether cable 110 above a predetermined minimum amount of tension at which the tether cable 110 may become slack. In addition, the electronic controller 405 may decrease the angular speeds of the four rotors 440-446 to keep the tension of the tether cable 110 below a predetermined maximum amount of tension at which the tether cable 110 may break.

Although aspects have been described in detail with reference to certain preferred embodiments, variations and modifications exist within the scope and spirit of one or more independent aspects as described.

What is claimed is:

1. An unmanned aerial vehicle comprising:
a body;
a platform coupled to the body such that the platform is rotatable relative to the body about a first horizontal axis of rotation normal to a vertical plane extending through the body;
a rotor rigidly coupled to the platform such that the rotor and the platform rotate together about the first horizontal axis of rotation;
a tether cable extending away from the body and coupled to the body such that the tether cable is rotatable relative to the body about a second horizontal axis of rotation normal to the vertical plane; and
an actuation system configured to rotate the platform in a clockwise direction about the first horizontal axis of rotation when the tether cable rotates in a counter-clockwise direction about the second horizontal axis of rotation.

2. The unmanned aerial vehicle of claim 1, wherein the vertical plane is a first vertical plane, wherein the platform coupled to the body such that the platform is rotatable relative to the body about a third horizontal axis of rotation normal to a second vertical plane, wherein the second vertical plane extending through the body and orthogonal to the first vertical plane, wherein the tether cable coupled to the body such that the tether cable is rotatable relative to the body about a fourth horizontal axis of rotation normal to the second vertical plane, and wherein the actuation system further configured to rotate the platform in the clockwise direction about the third horizontal axis of rotation when the tether cable rotates in the counter-clockwise direction about the fourth horizontal axis of rotation.

3. The unmanned aerial vehicle of claim 1, wherein the actuation system further configured to rotate the platform an angular distance based on a relative angle between the tether cable and the body.

4. The unmanned aerial vehicle of claim 3, wherein the actuation system further configured to rotate the platform the same angular distance as the tether cable.

5. The unmanned aerial vehicle of claim 1, further comprising an electronic controller configured to
determine a tension of the tether cable,
increase an angular speed of the rotor when the tension of the tether cable decreases, and
decrease the angular speed of the rotor when the tension of the tether cable increases.

6. The unmanned aerial vehicle of claim 1, wherein the tether cable configured to provide power to the unmanned aerial vehicle.

7. The unmanned aerial vehicle of claim 1, wherein the tether cable configured to transmit data from the unmanned aerial vehicle.

8. The unmanned aerial vehicle of claim 1, wherein the tether cable configured to couple the body to an external coupling.

9. An unmanned aerial vehicle comprising:
a body;
a platform coupled to the body such that the platform is rotatable relative to the body about a first horizontal axis of rotation normal to a vertical plane extending through the body;
a rotor rigidly coupled to the platform such that the rotor and the platform rotate together about the first horizontal axis of rotation;
a tether cable extending away from the body and coupled to the body such that the tether cable is rotatable relative to the body about a second horizontal axis of rotation normal to the vertical plane; and
a pulley system coupled to the tether cable and to the platform, wherein the pulley system configured to rotate the platform in a clockwise direction about the first horizontal axis of rotation when the tether cable rotates in a counter-clockwise direction about the second horizontal axis of rotation.

10. The unmanned aerial vehicle of claim 9, wherein the pulley system including
a first pulley positioned proximate to a first side of the platform,
a second pulley positioned proximate to a second side of the platform opposite the first side,
a first cable supported by the first pulley and coupled to the tether cable and to the second side of the platform, and
a second cable supported by the second pulley and coupled to the tether cable and to the first side of the platform.

11. The unmanned aerial vehicle of claim 9, wherein the vertical plane is a first vertical plane, wherein the platform coupled to the body such that the platform is rotatable relative to the body about a third horizontal axis of rotation normal to a second vertical plane, wherein the second vertical plane extending through the body and orthogonal to the first vertical plane, wherein the tether cable coupled to the body such that the tether cable is rotatable relative to the body about a fourth horizontal axis of rotation normal to the second vertical plane, and wherein the pulley system further configured to rotate the platform in the clockwise direction about the third horizontal axis of rotation when the tether cable rotates in the counter-clockwise direction about the fourth horizontal axis of rotation.

12. The unmanned aerial vehicle of claim 9, wherein the pulley system further configured to rotate the platform an angular distance based a relative angle between the tether cable and the body.

13. The unmanned aerial vehicle of claim 12, wherein the pulley system further configured to rotate the platform the same angular distance as the tether cable.

14. The unmanned aerial vehicle of claim 9, further comprising an electronic controller configured to
determine a tension of the tether cable,
increase an angular speed of the rotor when the tension of the tether cable decreases, and
decrease the angular speed of the rotor when the tension of the tether cable increases.

15. An unmanned aerial vehicle comprising:
a body;
a platform coupled to the body;
an electronic actuator configured to rotate the platform relative to the body about a first horizontal axis of rotation normal to a vertical plane extending through the body;
a rotor rigidly coupled to the platform such that the rotor and the platform rotate together about the first horizontal axis of rotation;
a tether cable extending away from the body and coupled to the body such that the tether cable is rotatable relative to the body about a second horizontal axis of rotation normal to the vertical plane; and
an electronic controller configured to
determine movement of the tether cable relative to the body, and
drive the electronic actuator to rotate the platform in a clockwise direction about the first horizontal axis of rotation when the tether cable rotates in a counter-clockwise direction about the second horizontal axis of rotation.

16. The unmanned aerial vehicle of claim 15, wherein the electronic actuator includes a motor and an arm, wherein the arm coupled to the motor and to the platform such that rotation of the motor causes rotation of the platform about the first horizontal axis of rotation.

17. The unmanned aerial vehicle of claim 15, wherein the vertical plane is a first vertical plane, wherein the electronic actuator is a first electronic actuator, wherein the unmanned aerial vehicle further comprising a second electronic actuator configured to rotate the platform relative to the body about a third horizontal axis of rotation normal to a second vertical plane, wherein the second vertical plane extending through the body and orthogonal to the first vertical plane, wherein the tether cable coupled to the body such that the tether cable is rotatable relative to the body about a fourth horizontal axis of rotation normal to the second vertical plane, and wherein the electronic controller further configured to drive the second electronic actuator to rotate the platform in the clockwise direction about the third horizontal axis of rotation when the tether cable rotates in the counterclockwise direction about the fourth horizontal axis of rotation.

18. The unmanned aerial vehicle of claim 15, wherein the electronic controller further configured to
   determine a relative angle between the tether cable and the body, and
   drive the electronic actuator to rotate the platform an angular distance based on the relative angle between the tether cable and the body.

19. The unmanned aerial vehicle of claim 18, wherein the electronic controller further configured to drive the electronic actuator to rotate the platform the same angular distance as the tether cable.

20. The unmanned aerial vehicle of claim 15, wherein the electronic controller further configured to
   determine a tension of the tether cable,
   increase an angular speed of the rotor when the tension of the tether cable decreases, and
   decrease the angular speed of the rotor when the tension of the tether cable increases.

* * * * *